United States Patent [19]

Grand

[11] 3,930,987

[45] Jan. 6, 1976

[54] CATALYST AND METHOD OF PREPARING SAME

[75] Inventor: Harry S. Grand, Willingboro, N.J.

[73] Assignee: Mobil Oil Corporation, New York, N.Y.

[22] Filed: May 30, 1974

[21] Appl. No.: 474,750

Related U.S. Application Data

[63] Continuation-in-part of Ser. No. 350,580, April 12, 1973, abandoned, which is a continuation-in-part of Ser. No. 125,326, March 17, 1971, abandoned.

[52] U.S. Cl................ 208/111; 208/120; 252/455 Z
[51] Int. Cl.² C10G 13/02; C10G 11/02; B01J 29/06
[58] Field of Search.......... 252/455 Z; 208/120, 111

[56] References Cited
UNITED STATES PATENTS

| | | | |
|---|---|---|---|
| 3,463,608 | 8/1969 | Elliott, Jr. | 252/455 Z |
| 3,556,988 | 1/1971 | Stover et al. | 252/455 Z |

*Primary Examiner*—Carl F. Dees
*Attorney, Agent, or Firm*—Charles A. Huggett; Raymond W. Barclay

[57] ABSTRACT

New catalyst for hydrocarbon conversion of organic feedstocks and method of preparing such catalyst. Catalyst is a composite made up of an inorganic oxide, wherein at least 50 weight percent of said inorganic oxide is silica and/or alumina, said matrix having dispersed therein a particulate crystalline aluminosilicate carrying rare earth cations, said composite catalyst having rare earth impregnated therein in an amount of from about 1 to 6 percent by weight (expressed as $RE_2O_3$), this amount being over and above the rare earth level attainable by ion exchange alone. impregnated rare earth may be incorporated into the catalyst by impregnating the composite with a rare earth-containing solution and then removing excess solution and drying, by impregnating the matrix with rare earth and then admixing the matrix with rare earth-exchanged crystalline aluminosilicate, or by impregnating rare earth-exchanged crystalline aluminosilicate with rare earth and then admixing the resultant rare earth-exchanged and impregnated crystalline aluminosilicate, preferably in the absence of any intermediate washing, with the matrix.

16 Claims, No Drawings

3,930,987

CATALYST AND METHOD OF PREPARING SAME

CROSS REFERENCE TO RELATED APPLICATIONS

This application is a continuation-in-part of my application Ser. No. 350,580, filed Apr. 12, 1973, which in turn is a continuation of my application Ser. No. 125,326, filed Mar. 17, 1971, both of which are now abandoned.

BACKGROUND OF THE INVENTION

1. Field of the Invention

This invention pertains to the field of catalytic compositions and methods for preparation and use thereof. More particularly, this invention pertains to a novel crystalline alumino-silicate zeolite catalyst and to a method of preparing such catalyst.

2. Description of the Prior Art

One of the recent major advances in catalyst technology was the discovery that catalytic compositions possessing both high activity and selectivity as well as superior attrition resistance in hydrocarbon conversion processing could be obtained by dispersing a crystalline aluminosilicate zeolite in an inorganic oxide matrix. Such compositions have been described, e.g., in U.S. Pat. Nos. 3,140,249 and 3,140,253 of C. J. Plank and E. J. Rosinski. It has further been found that certain desirable properties of such catalysts, including stability and activity, could be improved by replacing the alkali metals contained in the zeolites with other metals, particularly those of the rare earth group, and also by various pretempering treatments, e.g., steaming and dry thermal calcining.

SUMMARY OF THE INVENTION

I have discovered a new catalytic composition for use in the catalytic cracking of hydrocarbon oils and a method for preparation and use thereof, which composition exhibits decreased carbon deposition during use. My catalyst comprises a composite of a crystalline aluminosilicate carrying rare earth metal cations (hereinafter sometimes referred to as a rare earth zeolite), dispersed in an inorganic oxide matrix, wherein at least 50 weight percent of the inorganic oxide is silica and/or alumina. The matrix preferably is made up of silica, silica-alumina, silica-zirconia, or silica-zirconia-alumina, desirably along with a weighting agent, preferably clay. The aluminosilicate may have previously been ion exchanged with rare earth cations. The composite contains rare earth introduced by impregnation in an amount from about 1 to 6 percent by weight expressed as $RE_2O_3$. That is to say, foregoing 1 to 6 percent by weight of $RE_2O_3$ is in excess of the maximum rare earth content which can be achieved by ion exchange alone.

In accordance with one preferred aspect of my invention, the additional rare earth is incorporated in the composite by contacting the rare earth-exchanged composite with a rare earth salt solution, desirably removing excess salt solution, and drying. In accordance with another aspect of my invention, the additional rare earth is incorporated in the composite by treating the rare earth crystalline aluminosilicate with a solution of rare earth cations and then admixing the resulting rare earth-wetted crystalline aluminosilicate with the matrix.

In accordance with another preferred aspect of my invention, after the rare earth impregnation, subsequent drying is carried out over a period of time of at least 5 minutes under such conditions as to reduce the water content to below 20 percent by weight at the completion of said drying, thereby attaining enhanced performance of the resultant catalyst.

The composite catalysts of my invention exhibit superior selectivity and are particularly desirable because of their ability to crack hydrocarbons to relatively high yields of gasoline while having low coking tendencies (hereinafter sometimes referred to as "coke make"). This is of great value when dealing with "dirty" feedstocks, e.g., heavy gas oils and "recycle" stocks, which ordinarily give off appreciable coke yields when subjected to cracking.

DESCRIPTION OF THE PREFERRED EMBODIMENTS

The composite catalyst of my invention comprises crystalline aluminosilicate particles, having rare earth cations therein, these particles being contained in a porous inorganic oxide matrix, the matrix comprising an inorganic oxide, e.g., silica, silica-alumina, silica-zirconia, or silica-zirconia-alumina, desirably along with a weighting agent. As noted, the inorganic oxide should be made up of at least 50 percent be weight of silica and/or alumina.

The inorganic oxide should have a pore volume of at least 0.4 cc per gram. The weighting agent employed as a component of the matrix should be present in such an amount as to yield a resulting catalytic composition having a packed density of at least 0.3 gram per cc. (It is to be understood that when reference is made herein to properties of the composite such as, e.g., packed density, or to properties of the silica, silica-alumina, silica-zirconia or silica-zirconia-alumina matrix such as, e.g., pore volume, these references are to the fresh catalyst composite, i.e., to the composite prior to its actual use in catalytic conversion, but subsequent to the removal of water therefrom, as by heating to a temperature of 1200°F for three hours in substantially dry air.)

Referring to the synthetic amorphous inorganic oxide, e.g., silica, silica-alumina, silica-zirconia or silica-zirconia-alumina of the catalyst matrix, as previously noted, such synthetic amorphous inorganic oxide should desirably have a pore volume of at least 0.4 cc per gram. In general, the higher the pore volume, the more desirable is the overall composite catalyst, of course, provided that the pore volume is not so high as to adversely affect the attrition resistance of the catalyst. Thus, the pore volume of the synthetic amorphous inorganic oxide should be at least about 0.4 cc per gram. Generally it is from about 0.6 to 1.5 cc per gram, with a more preferred range being from about 0.8 to 1.3 cc per gram. The most preferable pore volume range is from about 1 to 1.2 cc per gram.

The matrix for my composite catalyst desirably also includes a weighting agent. Preferred weighting agents are clay and/or alumina. Representative clays are attapulgite, montmorillinite, hectorite and halloysite, with Kaolin being preferred. If alumina is employed, alpha alumina is preferred. Where a weighting agent is employed, the amount of agent employed desirable should be such that the final composite catalyst has packed density of at least 0.3 gram per cc. Generally the packed density of the composite catalyst will be from about 0.3 to 1 gram per cc, a more preferred range being from about 0.4 to 0.6 gram per cc.

The mean particle size of the weighting agent which may be incorporated as one component of the matrix is desirably less than about 40 microns. Preferably the particle size is from about 0.1 to 20, and most preferably from about 2 to 10 microns.

In the make up of the matrix, the relative proportions as between the synthetic amorphous inorganic oxide and weighting agent are advantageously from about 20 to 95% by weight of synthetic amorphous material and from about 5 to 80% by weight of weighting agent. A more preferred range is one wherein the synthetic amorphous inorganic oxide is from about 50 to 70 weight percent of the matrix and the weighting agent is from about 30 to 50 weight percent of the matrix.

Crystalline aluminosilicate particles are dispersed in the foregoing matrix, generally in such quantity that the overall composite contains from about 1 to 80 percent by weight of such crystalline aluminosilicate particles. Preferably, the composite will contain from about 2 to 25 percent by weight of crystalline alumino-silicate particles, the most preferred range being from about 5 to 15 percent by weight.

One means of preparing my composite catalyst involves dispersing the particulate weighting agent in a liquid medium, preferably water, to form a dispersion. Advantageously the concentration of weighting agent in the dispersion is from about 0.5 to 10 percent by weight, and most preferably from about 1 to 3 percent by weight. The foregoing dispersion is intimately admixed with an alkali metal silicate. Thus, aqueous alkali metal silicate may be slowly added to the weighting agent dispersion with thorough mixing. The mixing is conveniently carried out at room temperature, although if desired, lower or higher temperatures may be employed. The relative proportions as between the weighting agent dispersion and alkali metal silicate solution are not critical, and merely require that there be present sufficient alkali metal silicate to assure that the particles of weighting agent are coated therewith. Hence, the mixing is thorough so as to insure that the clay is uniformly dispersed and coated with alkali metal silicate.

After mixing, the admixture is heated to a temperature from about 70° to 150°F and then a strong acid, preferably $H_2SO_4$, is added to the admixture with mixing. Preferably, the acid is added at a uniform rate over a given period, e.g., from about one half hour up to about six hours.

The admixture is then heated to a temperature of from about 90° to about 200°F and maintained at this temperature for about 0.5 to 6 hours. Longer ageing times may be employed, but to no particular advantage. As will be apparent, in general, the higher the temperature, the less the time required at that temperature to effect ageing. Thus, the ageing could be carried out at temperatures as low as, e.g., room temperature, but then the time requirements for such ageing would be considerable so that the process would be uneconomical.

If silica-alumina, silica-zirconia, or silica-zirconia-alumina is to be employed rather than silica, suitable sources of aluminum and/or zirconium ions are added after the ageing step.

In one embodiment of the present invention, a source of aluminum ions is added to the aged admixture, generally in amounts sufficient to give from about 0.3 to 1.0 percent by weight $Al_2O_3$ in the final catalyst, on a dry basis. The alumina is typically added in the form of an aluminum salt, preferably aluminum sulfate.

Neither the concentration nor the amount of aluminum salt solution employed is critical. Thus, each may be adjusted so as to achieve the desired level of alumina in the overall amorphous inorganic oxide-weighting agent matrix. By way of illustration, the concentration of the aluminum salt solution may be of the order of 1 percent by weight to 30 percent by weight or even higher, a preferred range being from about 5 to 20 percent by weight, the most preferred range being from about 10 to 15 percent by weight.

Likewise, the temperature of the aluminum salt solution is not at all critical. It is generally most convenient to make up the solution at ambient temperature conditions and then add it to the aged admixture, although higher or lower temperatures may, of course, be employed.

Of course, the catalyst of my invention may also comprise a catalyst wherein the matrix is silica-zironia or silica-zirconia-alumina rather than silica-alumina or silica alone. In preparing such catalysts, a source of zirconium ions is added to the admixture after the foregoing aging step. If the matrix is also to contain alumina, the source of aluminum ions also may be added, as described hereinabove. The source of zirconium ions desirably is a zirconium salt, zirconium sulfate or acidified sodium zirconium silicate being preferred. An aqueous solution of the zirconium salt is advantageously employed.

Neither the concentration nor the amount of salt solution employed is critical. Thus, each may be adjusted so as to achieve the desired level of zirconia in the overall matrix. By way of illustration, the concentration of the zirconium salt solution may be of the order of 1 percent by weight to 30 percent by weight or even higher, a preferred range being from about 5 to 20 percent by weight, the most preferred range being from about 10 to 15 percent by weight.

Likewise, the temperature of the zirconium salt solution is not at all critical. It is generally most convenient to make up the solution at ambient temperature conditions and then add it to the aged admixture, although higher or lower temperatures may, of course, be employed.

Where zirconia is to be present as a component of the matrix, it is desirable that the zirconia level of the synthetic amorphous inorganic oxide be from about 0.5 to 25 % by wt on a dry basis. A more preferred range is from about 1 to 10 percent, with the most preferred range being from about 2 to 5 percent. As previously pointed out, the desired zirconia level is readily obtained by appropriate selection of concentration and/or amount of zirconium salt solution employed.

After the heat-ageing step and the addition of any aluminum or zirconium salts, sufficient acid (desirably sulfuric) is added to the slurry, with agitation, to reduce the pH from a higher value, such as in the range of 9 to 10.5, to a pH in the approximate range of 4 to 7. Preferably the pH is reduced to from about 4.0 to 5.0, with from about 4.4 to 4.6 being the most preferred range. This addition of acid at this point results in the formation of a synthetic amorphous inorganic oxide-weighting agent matrix slurry wherein the inorganic oxide is characterized on a dry basis, by a pore volume of at least 0.4 cc/gram.

To the foregoing synthetic amorphous oxide-weighting agent matrix slurry a catalytically active component is added, this component comprising a crystalline aluminosilicate. While it frequently is advantageous to employ a rare earth crystalline aluminosilicate, this is not at all essential, as is demonstrated by Examples 17 and 18 hereinafter. Thus, other crystalline aluminosilicates, e.g., sodium Y, may readily be employed.

Various suitable crystalline aluminosilicates for use in the composite catalysts of my invention are described in U.S. Pat. Nos. 3,140,249 and 3,140,253, both of which are incorporated herein by reference. Representative crystalline aluminosilicates suitable for the present invention include those natural and synthetic crystalline aluminosilicates having uniform pores of a diameter preferably between about 3 and 15 Angstrom units. Such crystalline aluminosilicates include a wide variety of aluminosilcates both natural and synthetic which have a crystalline or combination of crystalline and amorphous structure. However, it has been found that exceptionally superior catalysts can be obtained when the starting aluminosilicate has either a crystalline or a combination of crystalline and amorphous structure and possesses at least 0.4 and preferably 0.6 to 1.0 equivalent of metal cations per gram atom of aluminum. The aluminosilicates can be described as a three-dimensional framework of $SiO_4$ and $AlO_4$ tetrahedra in which the tetrahedra are cross linked by the sharing of oxygen atoms whereby the ratio of total aluminum and and silicon atoms to oxygen atoms is 1:2. In their hydrated form, the alumino-silicates may be represented by the formula:

$$M_{2/n}O:Al_2O_3:wSiO_2:YH_2O$$

wherein M represents at least one cation which balances the electrovalence of the tetrahedra, n represents the valence of the cation, w the moles of $SiO_2$ and Y the moles of $H_2O$. The cation can be any or more of a number of metal ions, depending upon whether the aluminosilicate is synthesized or occurs naturally. Typical cations include rare earths, sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Aluminosilicates falling within the above formula are well known and include synthesized aluminosilicates or natural occuring aluminosilicates. Among the aluminosilicates are included Zeolites A, Y, L, D, T, X, ZK-4, ZK-5, levynite, erionite, faujasite, analcite, noselite, phillipsite, brewsterite, natolite, chabazite, gmelinite, leucite, scapolite, and mordenite. The preferred aluminosilicates are those having pore diameters of at least about 4 Angstroms.

Particularly preferred rare earth zeolites for use in this invention may be made by base exchange of sodium zeolite X with rare earth ions to form rare earth zeolite X (see, e.g., Plank et al., U.S. Pat. No. 3,140,249, Example 26), and by base exchange of sodium zeolite Y with rare earth ions to form rare earth zeolite Y (see, e.g., Plank et al., U.S. Pat. No. 3,436,357, Example 1), as described hereinafter.

It is to be understood that mixtures of the various aluminosilicates previously set forth can be employed as well as individual aluminosilicates.

Crystalline aluminosilicates having pore diameters between about 3 and 5 Angstrom units may be suitable for size-selective conversion catalysis, while crystalline aluminosilicates having pore diameters between about 6 and 15 Angstrom units are preferred for hydrocarbon conversion such as catalytic cracking and the like.

The crystalline aluminosilicate particles employed as a component in the catalyst compositions of the present invention are essentially characterized by a high catalytic activity. This high catalytic activity is imparted to the particles by base exchanging, as by base exchanging alkali metal aluminosilicate particles before dispersion thereof in the matrix with a base-exchange solution containing rare earth cations. Suitable methods of base exchange are described in the aforenoted U.S. Pat. Nos. 3,140,249 and 3,140,253.

Where an alkali metal aluminosilicate is employed initially, it is frequently advantageous to base exchange the aluminosilicate particles before compositing with the matrix to reduce the sodium content of the final product to less than about 4% by weight and preferably less than 1% by weight. Such base exchange can also be performed after compositing. The sodium content of the final composite is essentially less than 4% by weight. In no instance should there be any more than 0.25 equivalents of alkali metal per gram atom of aluminum associated with the aluminosilicate. Such compositions provide high catalytic activity when Zeolite Y is the crystalline aluminosilicate component. Preferably, however, and particularly when Zeolite X is the crystalline aluminosilicate component, the sodium content of the final composite should be less than 1% by weight.

As noted, the rare earth crystalline aluminosilicate is obtained by treating a crystalline aluminosilicate with a fluid medium, preferably a liquid medium, containing cations of at least one rare earth. Rare earth metal salts represent the source of rare earth cation. The product resulting from treatment with a fluid medium is an activated crystalline and/or crystalline-amorphous aluminosilicate in which the structure thereof has been modified primarily to the extent of having the rare earth cations chemisorbed or ionically bonded thereto.

As described hereinafter, the incorporation of the rare earth cations is preferably carried out on the zeolite prior to dispersion in the matrix, although alternatively, the entire composite may be subjected to ion exchange. In either event, the ion exchange is carried out in such manner to insure essentially complete substitution of the rare earth cation for the alkali.

Water is the preferred solvent for the cationic salt, e.g., rare earth metal salt, for reasons of economy and ease of preparation in large scale operations involving continuous or batchwise treatment. Similarly, for this reason, organic solvents are less preferred but can be employed providing the solvent permits ionization of the cationic salt. Typical solvents include cyclic and acyclic ethers such as dioxane, tetrahydrofuran, ethyl ether, diethyl ether, diisopropyl ether, and the like; ketones, such as acetone and methyl ethyl ketone; esters such as ethyl acetate; alcohols such as ethanol, propanol, butanol, etc; and miscellaneous solvents such as dimethylformamide, and the like.

In carrying out the treatment with the fluid medium, the procedure employed varies depending upon the particular alumino-silicate which is treated. If the aluminosilicate which is treated has alkali metal cations associated therewith, then the treatment with fluid medium or media should be carried out until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations.

Effective treatment with the fluid medium to obtain a modified aluminosilicate having high catalytic activity will vary, of course, with the duration of the treatment and the temperature at which the treatment is carried out. Elevated temperatures tend to hasten the speed of treatment whereas the duration thereof varies inversely with the general concentration of ions in the fluid medium. In general, the temperatures employed range from below ambient room temperature of 24°C. up to temperatures below the decomposition temperature of the alumino-silicate. Following the fluid treatment, the treated alumino-silicate is washed with water, preferably distilled water, until the effluent wash water has a pH value of wash water, i.e., between 5 and 8. The aluminosilicate material is thereafter analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of rare earth metal cations in the form of a molten material, vapor, aqueous, or non-aqueous solution may be passed slowly through a fixed bed of aluminosilicate. If desired, hydrothermal treatment or corresponding non-aqueous treatment with polar solvents may be effected by introducing the aluminosilicate and fluid medium into a closed vessel maintained under autogeneous pressure. Similarly, treatments involving fusion or vapor phase contact may be employed.

A wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates, and the like. The only limitation on the particular rare earth metal salt or salts employed is that it is sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides or didymium chlorides. As hereinafter referred to, unless otherwise indicated, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium, samerium and gadolinium as well as mixtures of rare earth cations containing a predominant amount of one or more of the above cations are preferred since these metals provide optimum activity for hydrocarbon conversion, including catalytic cracking.

It is preferred that the novel compositions of the present invention have at least 0.4 and more desirably 0.6 to 1.0 equivalent of rare earth metal cations per gram atom of aluminum.

A more preferred embodiment of this invention uses rare earth zeolite compositions which have from 0.5 to 1.0 equivalent per gram atom of aluminum of rare earth metal cations. Thus, as noted hereinabove, rare earth metal cations are substantially the only metallic cations associated with the aluminosilicate.

While not wishing to be bound by any theory of operation, it nevertheless appears that the rare earth cations tend to impart stability to the aluminosilicate compositions, thereby rendering them far more useful for catalytic purposes, particularly in hydrocarbon conversion processes such as cracking.

The mean particle size of the crystalline aluminosilicate incorporated into the matrix is advantageously less than about 40 microns. Preferably the particle size is in the range of about 0.1 to 20 microns, and most preferably from about 2 to 10.

As previously noted, the matrix into which the crystalline aluminosilicate is dispersed is prepared in such a manner that, as charged to the cracking unit, the synthetic amorphous oxide desirably has a pore volume of at least about 0.4 cc/g.

The porosity of the matrix can be adjusted so as to obtain the desired pore volume. Thus, increased porosity may be obtained, for example, by increasing the time and temperature of aging the silica gel. For a more detailed discussion of such prior art techniques for adjusting porosity, see "Control of Physical Structure of Silica-Alumina Catalyst" by Ashley et al., Vol. 44, Industrial and Engineering Chemistry, at pages 2861–2863 (December 1952).

The aluminosilicate is incorporated into the matrix by preparing a slurry of the fine particles of the crystalline aluminosilicate, preferably in an aqueous medium. Its concentration in its slurry is preferably in the range from about 1 to 40%. The concentration of the matrix in its slurry is preferably in the range of about 1 to 15%. The two slurries are then thoroughly mixed.

In one embodiment, after mixing, the blend is then filtered to removed water from the slurry and thus improve control of the solids concentration in the slurry going to the spray dryer. This, in turn, provides greater control over the particle size distribution of the particles coming from the spray dryer.

Filtration normally increases the total solids concentration of the blend to over 8%, e.g., typically from about 10 to 12%. Filtration also removes some dissolved salts. Without such filtration, and without the improved control of solids content of the slurry obtained thereby, the particle distribution of the catalyst coming from the spray dryer would vary over a wide range.

The rate of filtration of the slurry is also important inasmuch as the faster the slurry filters, the better is the control over the solid content of the slurry going to the spray dryer. A significant factor affecting the filtration rate of the slurry is the size of the particles in the slurry. The larger the particles, the faster the slurry filters. The smaller the gel particles in the slurry, the slower the filtration time. If the particles are too small, the filtration operation is virtually impossible due to plugging of the filter.

The filtered material is then subdivided and dried to form the desired particles. A particularly good method of making microspherical particles (e.g. of particle size of about 1 to 200 microns, the bulk of which are in the range of about 40 to 80 microns) especially suitable for use in fluidized catalytic cracking, is spray drying, preferably under high pressures, e.g., of the order of from about 200 to 2000 psig, and preferably from about 1000 to 1500 psig.

The spray drying temperature is ordinarily within the range of 200°F to 1000°F. The temperature used will depend upon such factors as the quantity of material to be dried and the quantity of air used in the drying. The evaporation rate will vary depending on the quantity of air used in the drying. The temperature of the particles which are being dried is preferably within the range of 150°F to 300°F at the completion of the drying.

The drying is preferably effected by a process in which the particles to be dried and a hot air stream are moving in the same direction for the entire drying period (concurrent drying), or where the hot air stream flows in the opposite direction (countercurrent drying), or by semi-counter current drying.

After the dried particles have been formed they are preferably given a wet treatment to further remove alkali metal (which may, for example, be present, at this stage in amount of about 1 to 5%, and more usually from about 1 to 3%, based on the zeolite), by further base exchange with materials capable of providing hydrogen ions. One suitable technique for this purpose is to treat the particles with a solution of ammonium salt, e.g., with water containing about 1 – 5%, of ammonium sulfate to remove sodium ions, and then to wash the particles with water. A series of alternating ammonium sulfate and water treatments may be used, ending with a water wash to remove sulfate ions.

In accordance with one aspect of the invention, the foregoing ammonium-exchanged, water-washed composite, is then impregnated with rare earth ions under such conditions as to acheive a rare earth content, expressed as $RE_2O_3$, of from about 1 to 6 percent by weight (dry basis) in excess of the maxiumum $RE_2O_3$ content which can be achieved by ion exchange alone. Preferably, the said excess rare earth content by impregnation, expressed as $RE_2O_3$, should be from about 2 to 4 weight percent.

The impregnation is advantageously effected by contacting the foregoing composite with an aqueous solution of a rare earth salt. The residence time is not critical, provided that it is sufficient to assure good contact between the foregoing product and the rare earth salt solution.

The impregnation may be carried out at atmospheric pressure or at a pressure of several atmospheres.

The temperature of the impregnating solution should, of course, be sufficiently high to assure dissolution of the rare earth salt.

The concentration of the impregnating solution is not critical. Thus, the concentration will vary, depending upon such factors as the amount of rare earth pickup desired, the solids content of the composite being impregnated, etc. Generally, the concentration of the impregnating solution will be from about 5 to 75 grams of rare earth salt (expressed as $RECl_3.6H_2O$) per liter, although either higher or lower concentrations may be employed.

The impregnation step may be carried out by any number of known contracting procedures. The procedure that is particularly advantageous involves slurrying the rare earth salt in a quantity of water that is in excess of that required to fill the catalyst pore volume, e.g., from one and one half to several times such required amount. The ammonium-exchanged waterwashed composite is then added to the rare earth solution. The contacting may be carried out at any convenient temperature and pressure, e.g., ambient temperature and atmospheric pressure, such conditions not being critical. The contact time may vary depending on the pore volume of the catalyst, but should be sufficient to achieve thorough blending. Desirably, the mixture is subsequently filtered, e.g., to approximately 50% solids, and is then dried, e.g., at about 250°F. The concentration of rare earth salt in the slurry is selected so as to give the desired take-up of either soluble rare earth salt or rare earth oxide.

Alternatively, the ammonium-exchanged, waterwashed composite may be dried. Thereafter, the dried composite may be contacted with a solution of rare earth salt, the amount of solution being sufficient to fill the pores of the catalyst but leave the external surface of the catalyst essentially dry. Here too, the concentration of the rare earth salt in the solution will depend on the amount of rare earth desired to be impregnated in the catalyst; the contacting may be carried out at any convenient temperature and pressure; and the contact time may vary. The impregnated catalyst is then dried, generally at about 250°F.

A wide variety of soluble rare earth salts can be employed with facility for the foregoing impregnation step. Suitable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malanates, oxalates, palmitates, hydroxides, tartrates, and the like. The preferred rare earth salts are the chlorides, nitrates and acetates.

In accordance with another aspect of the invention, the ammonium-exchanged water-washed composite previously referred to is first subjected to a post-exchange with rare earth ions, and thereafter the post-exchanged composite is impregnated with rear earth. Thus, the ammonium-exchange water-washed composite is treated with a solution containing rare earth ions so as to replace ammonium and residual alkali metal with rare earth ions and to insure substantially complete substituion of rare earth metal for other cations. Desirably, the rare earth ions are used as aqueous solutions of water soluble salts thereof, e.g., as rare earth chloride hexahydrate.

The foregoing post-exchange is desirably carried out using an equivalent amount of rare earth cation equal to at least 50% of the equivalents of alkali metal, e.g., sodium, present in the crystalline zeolite prior to the wet processing treatment with ammonium ions. Preferably, the equivalent amount of rare earth cation employed is equal to 100% of sodium present, i.e., the full stoichiometric amount required to replace all of the sodium present, or is in excess of the stoichiometric amount required. The rare earth cation may be supplied from a solution having a concentration of about 0.1 to 1% by weight of the soluble salts thereof, for example, a rare earth chloride, although higher concentrations may, of course, be employed. Desirably, the exchange is conducted at a temperature of from about 60° to 120°F for a time between about 1 and 60 minutes.

The foregoing is followed with one or more water washes to minimize the chloride content of the finished catalyst.

The particles are then dried in any suitable manner, as by flash drying.

By virtue of the foregoing wet treatment of the dried particles with aqueous ammonium sulfate (and optionally with aqueous rare earth chloride if a post-exchange is employed) to further remove alkali metal from the zeolite and matrix, ammonium ions (and, if there has been a post-exchange, additional rare earth cations) are introduced. Upon subsequent drying, ammonia is liberated leaving hydrogen ions, so that the zeolite may contain both rare earth metal cations and hydrogen ions, thus resulting in a catalyst having highly desirable characteristics.

The efficiency of this subsequent treatment is greatly improved if the rare earth zeolite, in finely divided condition, has previously been pretempered by subjecting it to dehydrating conditions, as by calcination, to lower its residual moisture content to a value within the range of 0.3 to 6%, more preferably within the range of 1.5 to 6%, such pretempering having been effected before the rare earth zeolite is brought into contact with the matrix. As a result of this pretempering the rare earth zeolite can be later exchanged to a lower sodium content much more easily, it becomes more resistant to loss of crystallinity on contact with acidic media and the relative crystallinity of the final product is higher. In addition, the rare earth component becomes more fixed in the crystalline aluminosilicate and more resistant to removal on subsequent base exchanges.

Suitable pretempering conditions are, for example, a temperature of about 650°F in air for about 60 minutes or a temperature of about 1500°F in air for about 10 minutes, or a treatment with superheated steam at about 1100°–1200°F at 15 psig for from about 10 to 60 minutes; a preferred treatment is at atmospheric pressure at a temperature of about 1050°–1250°F in steam, air, or a steam-air mixture for from about 10 to 60 minutes. (This pretempering technique is described more fully in U.S. application Ser. No. 459,687, filed May 28, 1965, entitled "Improved Crystalline Zeolites and Method of Preparing Same".)

Where the crystalline aluminosilicate initially employed is a rare earth crystalline aluminosilicate, then the catalyst composite will, prior to impregnation with rare earth salt solution, generally have a earth oxide ($RE_2O_3$) content in the range from about 1.0 to 6.0% by weight depending on the total amount of rare earth zeolite in the catalyst. This rare earth has been incorporated in the catalyst by ion exchange that is, by the exchange carried out on the zeolite itself, and optionally also by post-exchange of the composite, each of which have been described in detail previously. Thus, the maximum $RE_2O_3$ content of the catalyst obtainable by ion exchange is limited by the total number of sites in the zeolite available for such exchange.

In accordance with said second aspect of the invention, the dried catalyst is then subjected to a rare earth impregnation step in order to increase the $RE_2O_3$ content of the catalyst an additional 1 to 6 percent by weight, i.e., 1 to 6 percent by weight over and above the $RE_2O_3$ content resulting from ion exchange. Preferably, the increase in $RE_2O_3$ content by impregnation is from about 1 to 3 percent by weight. The impregnation step is carried out as described previously, the preferred methods being either (1) contacting the dried catalyst with a solution of rare earth salt, the amount of solution being sufficient to fill the pores of the catalyst but leave the external surface of the catalyst substantially dry, and thereafter drying, or (2) slurrying the rare earth salt in a quantity of water that is in excess of that required to fill the catalyst pore volume, adding the dried catalyst to this rare earth solution, filtering the resulting mixture, and drying.

It is important to note that, following the rare earth impregnation step, subsequent processing, such as drying to fix the impregnated rare earth as $RE_2O_3$, etc., is preferably carried out in the absence of any intermediate washing of the rare earth-impregnated product. Thus, washing of the rare earth-impregnated product prior to further processing, e.g., drying, would tend to remove excess rare earth ions from the product, thereby tending to eliminate the desired excess rare earth of impregnation. Of course, in some instances it may be desirable to subject the rare earth impregnated product to slight or moderate washing prior to drying, provided that care is taken not to remove all of the excess of rare earth ions, so that sufficient excess rare earth ions remain to form the desired level of impregnated $RE_2O_3$ upon drying.

As noted previously, rather than subject the overall composite to rare earth impregnation, an alternative method of making the rare earth-impregnated composite is to treat the matrix with a rare earth salt solution and thereafter to admix the so-treated matrix with the rare earth crystalline alumino-silicate. Alternatively, the rare earth-treated matrix can first be filtered and the filter cake then be admixed with the rare earth crystalline aluminosilicate. Note that such admixing is effected without an intermediate washing step. The resultant mixture is then dried without any additional wet processing, so as to avoid removal of rare earth. This technique is illustrated in Example 32 hereinafter.

In accordance with yet another embodiment of the invention, the rare-earth impregnated composite may be obtained by treating a rare earth crystalline aluminosilicate with a solution of rare earth ions to form a rare earth-wetted crystalline aluminosilicate, and thereafter admixing such wetted crystalline aluminosilicate with the matrix. See, e.g., Example 19 hereinafter. This technique, while practicable, is not as desirable as the procedure wherein the entire catalyst composite (matrix plus particulate rare earth zeolite) is subjected to rare earth impregnation. Compare, e.g., Examples 20 and 21 with Example 19.

In accordance with still another aspect of my invention, I have found that particularly good results are obtained when, following the rare earth impregnation step, the subsequent drying step is carried out over a period of time of at least 5 minutes, and preferably at least 10 minutes, under such conditions as to reduce the water content to below 20 percent by weight at the completion of said drying. See, e.g., Examples 34 and 35 hereinafter. As a result of this relatively slow drying procedure, the performance of the resultant catalyst is further enhanced.

The finished catalyst is characterized by a residual sodium content not in excess of about 1.0 weight percent, expressed as $Na_2O$, based upon the weight of the dried catalyst. Indeed, a catalyst having a residual sodium content not in excess of about 0.2 weight percent $Na_2O$ may readily be attained, and where the dispersed rare earth zeolite is of the X form (as contrasted to rare earth zeolite Y) the residual sodium level is preferred to be not in excess of about 0.1 weight percent $Na_2O$.

The catalysts of this invention can, by a relatively mild heat treatment, be put in a highly active condition in which they are suitable for direct use in fluid catalytic cracking and in which they exhibit the desired selectivity for producing gasolines, mainly at the expense of the undesirable products of cracking, e.g., dry gas and coke. This heat treatment can take place during regular cracking-regeneration cycles. Thus, when the catalysts are added, as makeup, in an operating fluid catalytic cracking installation they will soon attain their desired selectivity after a few cracking-regeneration cycles, without the need of a preliminary steam-activating step. Alternatively, the catalysts may be given a preliminary heat treatment in air (and in fluidized condition) at a temperature of 1100–1400°F for from about 3 to 16 hours.

The following examples will further illustrate my invention. All parts are by weight unless otherwise indicated.

EXAMPLES 1-8

A series of eight catalysts was prepared, each having the following composition: 10% rare earth Y crystalline aluminosilicate zeolite (REY) and 90% matrix, the matrix being made up of 40% clay, 57.4% silica, 2% zirconia, and 0.6% alumina.

The procedure employed in preparing the eight catalysts was as follows: 2125 pounds of Georgia Kaolin clay on a dry weight basis were mixed with 54,400 pounds (6550 gallons) of deionized water. 11,100 pounds (960 gallons) of Q-brand sodium silicate $[Na_2O(SiO_2)_{3.3}]$ containing 3200 pounds of $SiO_2$ were added to the water-clay slurry with stirring over a period of one half hour. The clay was uniformly dispersed and coated with sodium silicate. The admixture was then heated to 120°F, and sulfuric acid (35%) was added at a uniform rate, while mixing, to adjust the pH to 9.8.

After the foregoing acid addition, in each instance, the admixture was heat aged for one hour at a temperature sufficient to produce a catalyst with a pore volume of 0.65–0.71 cc/g. An aqueous solution of aluminum sulfate (20 weight percent aluminum sulfate) was then added to the aged admixture at a uniform rate over a period of one half hour in such amount so as to provide a final alumina content of 0.6 weight percent, based on the total dry catalyst weight.

A slurry was prepared by mixing 19 gallons of 66° Baume sulfuric acid into a dispersion of 240 pounds of sodium zirconium silicate ($Na_2ZrSiO_5$) in 270 gallons of deionized water. This slurry, which had a pH less than 0.4, was added at a uniform rate over a period of 30 to 45 minutes in such amount as to provide a final concentration of zirconia ($ZrO_2$) of 2.0 weight percent, based on the weight of the dry catalyst.

The pH of the mixture was then adjusted to between 4.5 and 4.6 by the addition of 35% sulfuric acid over a one half hour period.

600 pounds of REY that previously had been 68% exchanged, i.e., 68% of the sodium content had been replaced with rare earth cations, which previously had been pretempered by calcining at about 1200°F. for about ten minutes, were slurried in about 210 gallons of deionized water. (The REY had the following composition: $Al_2O_3 = 19.9\%$; $SiO_2 = 60.3\%$; $RE_2O_3 = 15.5\%$; $Na_2O = 4.3\%$). This slurry was added to the silica-alumina-zirconia-clay slurry while mixing, in such amount as to provide a final REY concentration, based on the dry weight of the catalyst, of 10% by weight.

The blend was filtered. The filter cake was spray dried at 1400 – 1500 psig to yield a coarse grade catalyst. The spray dried product was ion exchanged with ammonium sulfate solution and then washed with deionized water until substantially free of sulfate ions. The resultant product was exchanged with an aqueous rare earth chloride solution ($RECl_3·6H_2O$) in such proportions that about 20 parts of rare earth chloride contacted about 2000 parts of catalyst (bone dry basis). After the exchange, the catalyst was water washed until essentially chloride free and the sulfate content was 0.5% by weight or less on a dry basis. The thus treated catalyst had an $Na_2O$ content of from about 0.11 to 0.16% by weight on a dry basis. After washing, the catalyst was flash dried. A sample of the foregoing flash dried catalyst was withdrawn and held as a "control". Hence, it was not subjected to impregnation. This control catalyst is designated as Example 1.

Seven samples of the flash dried catalyst were each subjected to an impregnation treatment. This treatment comprised mixing each sample with a solution of a rare earth salt. The concentration and amount of the rare earth salt in the solution varied from sample to sample in order to produce differing amounts of impregnated $RE_2O_3$ in each sample. The resulting impregnated catalysts are designated as Examples 2-8. The impregnation treatments for each of the samples were as follows.

EXAMPLE 2

2,000 grams of the flash dried catalyst were slurried in a mixture of 50 grams of rare earth chloride in 2,000 cc. of deionized water to provide an additional 1.0% by weight of $RE_2O_3$ in the finished catalyst.

EXAMPLE 3

2,000 grams of the flash dried catalyst were slurried with 100 grams of rare earth chloride in 2,000 cc. of deionized water to provide an additional 2.0% by weight of $RE_2O_3$ in the finished catalyst.

EXAMPLE 4

2,000 grams of the flash dried catalyst were slurried with 77.3 grams of rare earth acetate in 2,000 cc. of deionized water to provide an additional 1.2 weight percent of $RE_2O_3$ in the finished catalyst.

EXAMPLE 5

2,000 grams of the flash dried catalyst were slurried with 79.5 grams of rare earth nitrate in 2,000 cc. of deionized water to provide an additional 1.3 weight percent of $RE_2O_3$ in the finished catalyst.

For each of the catalysts of Examples 2–5, the amount of impregnating solution used was just sufficient to fill the pores of the catalyst, but to allow the surface of the catalyst to remain essentially dry. After thorough blending of the catalyst and the solution, each mixture was dried in an oven at 250°F. for approximately 6 hours.

EXAMPLE 6

2,000 grams of the flash dried catalyst were slurried with 250 grams of rare earth chloride in 7,000 cc. of deionized water to provide an additional 1.4 weight percent of $RE_2O_3$ in the finished catalyst.

EXAMPLE 7

2,000 grams of the flash dried catalyst were slurried with 104.4 grams of rare earth chloride in 3,000 cc. of deionized water to provide an additional 1.7 weight percent of $RE_2O_3$ in the finished catalyst.

EXAMPLE 8

2,000 grams of the flash dried catalyst were slurried with 550 grams of rare earth chloride in 7,000 cc. of deionized water to provide an additional 3.3 weight percent of $RE_2O_3$ in the finished catalyst.

For each of the catalysts of Example 7, the amount of impregnating solution used was about 1.5 times the volume required to fill the pores of the catalyst; in Examples 6 & 8, the impregnating solution was 3.5 times the volume required. After mixing the samples with the impregnating solution, the mixtures were filtered to a solids content of about 50%. Each of the filtered mixtures was then dried in an oven at 250°F. for approximately 16 hours.

The samples of the catalysts of Examples 1–8 were subjected to thermal treatments of varying degrees of severity. These treatments were:

Mild thermal
Calcining for 3 hours at 1,200°F in air;
Mild steaming
Steaming in 100% steam for 4 hours at 1,400°F. and 0 psig; and
Severe Steaming
Steaming in 100% steam for 5 hours at 1,400°F. and 15 psig.

After the foregoing thermal treatments, the samples were evaluated for catalytic performance using FCC Bench Tests. The results of these Tests are set out in Tables 1, 2 and 3.

TABLE 1

CATALYST IMPREGNATED WITH RARE EARTH:
AFTER MILD THERMAL TREATMENT (CALCINED 3 Hr/1200°F IN AIR)
BENCH FCC TESTS: 910°F, 2 C/O, 12.5 WHSV, WCMCGO

| Run No. | 1 | 2 | 3 | 4 |
|---|---|---|---|---|
| Catalyst of Example | 1 | 2 | 7 | 3 |
| Impregnation Salt | None | $RECl_3$ | $RECl_3$ | $RECl_3$ |
| $RE_2O_3$ Added by Impregnation, % wt | 0 | 1.0 | 1.7 | 2.0 |
| Conversion, % vol | 69.3 | 69.6 | 67.5 | 65.5 |
| $C_5+$ Gasoline, % vol | 55.3 | 59.4 | 57.4 | 56.4 |
| Total $C_4$'s, % vol | 15.0 | 13.5 | 12.6 | 11.9 |
| Dry Gas, % wt | 7.1 | 5.9 | 6.2 | 5.9 |
| Coke, % wt | 3.3 | 2.7 | 2.6 | 2.1 |
| Carbon on Cat., % wt | 1.43 | 1.16 | 1.09 | 0.91 |
| Selectivity ($C_5$ + Gasoline, % vol/Coke, % wt) | 16.8 | 22.0 | 22.0 | 26.8 |
| Hydrogen Factor* | 37 | 35 | 35 | 39 |
| Physical Properties | | | | |
| Pore Volume, cc/g | 0.62 | 0.61 | 0.63 | 0.59 |
| Packed Density, g/cc | 0.62 | 0.62 | 0.58 | 0.60 |
| Surface Area, m²/g | 345 | 330 | 347 | 326 |
| Chemical Properties | | | | |
| $Na_2O$, % wt | 0.15 | 0.12 | 0.07 | 0.12 |
| $RE_2O_3$, % wt | 2.20 | 3.20 | 3.90 | 4.20 |

*Hydrogen Factor = $\dfrac{\text{Moles } H_2}{\text{Moles } C_1 + \text{Moles } C_2} \times 100$

TABLE 2

CATALYST IMPREGNATED WITH RARE EARTH:
AFTER MILD STEAM TREATMENT (4 Hr/1400°F/0 psig)
BENCH FCC TESTS: 925°F, 3 C/O, 8.3 WHSV, WCMCGO

| Run No. | 5 | 6 | 7 | 8 | 9 | 10 | 11 | 12 |
|---|---|---|---|---|---|---|---|---|
| Catalyst of Example | 1 | 2 | 6 | 7 | 3 | 8 | 4 | 5 |
| Impregnation Salt | None | $RECl_3$ | $RECl_3$ | $RECl_3$ | $RECl_3$ | $RECl_3$ | $RE(Ac)_3$ | $RE(NO_3)_3$ |

TABLE 2-continued

CATALYST IMPREGNATED WITH RARE EARTH:
AFTER MILD STEAM TREATMENT (4 Hr/1400°F/0 psig)
BENCH FCC TESTS: 925°F, 3 C/O, 8.3 WHSV, WCMCGO

| Run No. | 5 | 6 | 7 | 8 | 9 | 10 | 11 | 12 |
|---|---|---|---|---|---|---|---|---|
| $RE_2O_3$ Added by Impregnation, % wt | 0 | 1.0 | 1.4 | 1.7 | 2.0 | 3.3 | 1.2 | 1.3 |
| Conversion, % vol | 69.2 | 68.3 | 68.2 | 67.6 | 70.7 | 64.1 | 69.6 | 71.8 |
| $C_5$ + Gasoline, % vol | 58.3 | 58.4 | 59.1 | 59.7 | 60.7 | 57.1 | 61.5 | 62.5 |
| Total $C_4$'s, % vol | 13.9 | 12.7 | 12.6 | 12.1 | 13.3 | 11.2 | 12.4 | 13.2 |
| Dry Gas, % wt | 6.2 | 5.8 | 5.5 | 5.4 | 5.8 | 4.9 | 5.6 | 5.8 |
| Coke, % wt | 2.3 | 2.3 | 2.0 | 1.9 | 1.9 | 1.6 | 1.7 | 2.1 |
| Carbon on Cat., % wt | 0.65 | 0.66 | 0.57 | 0.55 | 0.54 | 0.46 | 0.50 | 0.60 |
| Selectivity ($C_5$ + Gasoline, % vol/Coke, % wt) | 25.3 | 25.4 | 29.5 | 31.4 | 32.2 | 30.0 | 36.2 | 29.8 |
| Hydrogen Factor | 16 | 16 | 17 | 18 | 17 | 21 | 18 | 22 |
| Physical Properties | | | | | | | | |
| Pore Volume, cc/g | 0.53 | 0.51 | 0.51 | 0.51 | 0.52 | 0.50 | 0.53 | 0.54 |
| Packed Density, g/cc | 0.64 | 0.65 | 0.64 | 0.66 | 0.67 | 0.67 | 0.65 | 0.65 |
| Surface Area, m²/g | 177 | 191 | 188 | 196 | 195 | 208 | 197 | 200 |
| Chemical Properties | | | | | | | | |
| $Na_2O$, % wt | — | 0.14 | 0.08 | 0.07 | 0.14 | — | — | — |
| $RE_2O_3$, % wt | — | 3.20 | 3.60 | 3.90 | 4.20 | 5.50 | — | — |

TABLE 3

CATALYST IMPREGNATED WITH RARE EARTH:
AFTER SEVERE STEAM TREATMENT (5 Hr/1400°F/15 psig)
BENCH FCC TESTS: 925°F, 3 C/O, 8.3 WHSV, WCMCGO

| Run No. | 13 | 14 | 15 | 16 |
|---|---|---|---|---|
| Catalyst of Example | 1 | 6 | 4 | 5 |
| Impregnation Salt | None | $RECl_3$ | $RE(Ac)_3$ | $RE(NO_3)_3$ |
| $RE_2O_3$ Added by Impregnation, % wt | 0 | 1.4 | 1.2 | 1.3 |
| Conversion, % vol | 48.7 | 56.2 | 53.3 | 58.9 |
| $C_5$ + Gasoline, % vol | 42.1 | 47.7 | 46.3 | 52.1 |
| Total $C_4$'s, % vol | 8.2 | 10.8 | 9.3 | 9.8 |
| Dry Gas, % wt | 4.4 | 5.1 | 4.7 | 4.7 |
| Coke, % wt | 2.0 | 1.9 | 1.7 | 2.0 |
| Carbon on Cat., % wt | 0.57 | 0.54 | 0.50 | 0.58 |
| Selectivity ($C_5$ + Gasoline, % vol/Coke, % wt) | 21.1 | 25.1 | 27.2 | 26.1 |
| Hydrogen Factor | 18 | 16 | 16 | 18 |
| Physical Properties | | | | |
| Pore Volume, cc/g | 0.50 | 0.47 | 0.50 | 0.50 |
| Packed Density, g/cc | 0.64 | 0.65 | 0.65 | 0.68 |
| Surface Area, m²/g | 118 | 126 | 125 | 133 |
| Chemical Properties | | | | |
| $Na_2O$, % wt | 0.11 | 0.08 | — | — |
| $RE_2O_3$, % wt | 2.20 | 3.60 | 3.40 | 3.50 |

Referring to the data in Table 1, the markedly lower coke make, after mild thermal treatment obtained in Runs 2, 3 and 4, namely, weight percents of 2.7, 2.6 and 2.1, respectively, wherein the catalysts were impregnated in accordance with the present invention, as compared to that in Run 1, namely, 3.3, wherein the control catalyst was used, are readily apparent. Similarly, Runs 2-4 resulted in less dry gas than did Run 1. Also the yield of $C_5$ + Gasoline for the catalysts of Runs 2, 3 and 4 are substantially higher than that for the control.

The thermal treatment of the catalyst drives off about 10-15% weight of water. The condition of the resulting catalyst simulates the condition of makeup catalyst just after such catalyst has been added to an equilibrium catalyst in a regenerator. The coke make of the catalyst at this stage of the process is very important, inasmuch as the lower the coke make, the longer life the catalyst will have, due to a decrease in heat damage during the initial regeneration cycles.

The data in Table 2 shows the FCC Test results of the catalysts of Examples 1-8 after mild steam treatment. The decrease in coke make for the impregnated catalysts of the present invention, i.e., Runs 7, 8 and 9, as compared with control, i.e., Run 1, is readily apparent. Note also that in Run 10, wherein the $RE_2O_3$ added by impregnation is above 3.0 weight percent, although the coke make decreases to a value of 1.6, the conversion level, i.e., activity of the catalyst, is substantially decreased, that is, 64.1% vol. for Run 10 as compared with the 67-68% vol. range for Runs 7-9.

Runs 11 and 12 illustrate the catalysts of the present invention wherein the impregnation salt is rare earth acetate and rare earth nitrate, respectively. Here too improvements in coke make and selectivity are obtained that are similar to those observed with catalysts wherein the impregnation salt was a rare earth chloride.

Referring to Table 3, it is apparent that after severe steaming the activity (conversion) and the selectivity of those catalysts which have been impregnated with rare earth, namely, the catalysts used in Runs 14, 15 and 16, are superior to the conversion and the selectivity obtained using the control catalyst (Run 13).

Mild steam pretreatment produces a catalyst which possesses activity similar to that possessed by the equilibrium catalyst in an actual process. The severe steam treatment produces a catalyst possessing an activity similar to that of the aged, less active fraction of an equilibrium catalyst. The difference in the loss of activity between the mild steam treatment and the severe steam treatment is indicative of the steam stability and the resistance to ageing of the catalyst. The superior steam stability of the catalysts of this invention is shown by comparing the decrease in conversion for the catalysts of Examples 6, 4 and 5. That is, for Runs 7 and 14, 11 and 15 and 12 and 16, the decrease is only 12.0, 16.3 and 12.9% vol., respectively, as compared with a conversion loss of 20.5% vol. for the control catalyst (Runs 5 and 13).

EXAMPLES 9 AND 10

A second series of two catalysts was prepared. This series was prepared in essentially the same manner as the catalysts of Examples 1–8, with the exception that the catalysts of the second series contained 15 weight percent rare earth zeolite rather than 10%. These catalysts were prepared as follows: 2125 lbs. of Georgia Kaolin clay on a dry weight basis were mixed with 54,400 lbs. (6550 gallons) of deionized water. 11,100 lbs. (960 gallons) of Q-brand sodium silicate [$Na_2O(SiO_2)_{3.3}$] containing 3200 lbs. of $SiO_2$ were added to the water-clay slurry with stirring over a period of one-half hour. The clay was uniformly dispersed and coated with sodium silicate. The admixture was then heated to 120°F. and sulfuric acid (35%) was added at a uniform rate, while mixing, to adjust the pH to 9.8.

After the foregoing acid addition, in each instance the admixture was heat aged for one hour at a temperature sufficient to produce a catalyst with a pore volume of 0.65–0.71 cc/g. An aqueous solution of aluminum sulfate (20 weight percent aluminum sulfate) was then added to the aged admixture at a uniform rate over a period of one-half hour in such amount as to provide a final alumina content of 1.0 weight percent based on the total weight of dry catalyst. A slurry was prepared by mixing 19 gallons of 66° Baume sulfuric acid into a dispersion of 240 lbs. of sodium zirconium silicate ($Na_2ZrSiO_5$) in 270 gallons of deionized water. This slurry, which had a pH less than 0.4, was added at a uniform rate over a period of one-half hour in such amount as to provide a final concentration of zirconia ($ZrO_2$) of about 2 percent by weight, based on the weight of the dry catalyst.

The pH of the mixture was then adjusted to between 4.5 and 4.6 by the addition of 35% sulfuric acid over a one-half hour period.

953 lbs. of REY that previously had been 68% exchanged, i.e., 68% of the sodium content had been replaced with rare earth cations, and pretempered by calcining at about 1200°F. for about ten minutes, were slurried in about 335 gallons of deionized water. (The REY had the following composition: $Al_2O_3$ = 19.9%; $SiO_2$ = 60.3%; $RE_2O_3$ = 15.5%; $Na_2O$ = 4.3%). This slurry was added to the silica-alumina-zirconia-clay slurry while mixing, in such amount as to provide a final REY concentration, based on the dry weight of the catalyst, of 15% by weight. The blend was filtered. The filter cake was spray dried at 1400–1500 psig to yield a course grade catalyst.

The spray dried product was ion exchanged with ammonium sulfate solution and then washed with deionized water until substantially free of sulfate ions. The resultant product was exchanged with an aqueous rare earth chloride solution ($RECl_3 \cdot 6H_2O$) in such proportions that about 20 parts of rare earth chloride contacted about 2000 parts of catalysts (bone dry basis). After the exchange, the catalyst was water washed until essentially chloride-free and the sulfate content was 0.5% by weight or less on a dry basis. The thus treated catalyst had a $Na_2O$ content of from about 0.15 to 0.22% by weight on a dry basis. After washing, the catalyst was flash dried. A sample of the foregoing flash dried catalyst was withdrawn and held as a "control". Hence, it was not subjected to impregnation. This control catalyst is designated as Example 9.

The flash dried catalyst was then contacted with a rare earth nitrate salt solution, the amount of solution being sufficient to fill the pores of the catalyst but to leave the surface of the catalyst dry. The solution contained 133 grams of rare earth nitrate in 2000 cc. of deionized water to give an additional 2.0% by weight of $RE_2O_3$ in the finished catalyst. The impregnated catalyst was then dried in an oven at about 250°F for about 10 hours. This catalyst was designated Example 10.

The catalysts of Examples 9 and 10 were then subjected to a mild thermal treatment for three hours at 1200°F. in air. Each of the catalysts were then evaluated for catalytic performance using FCC Bench Tests. The results of these Tests are set out in Table 4.

TABLE 4

Catalyst (15% REY) Impregnated With Rare Earth
(as $RE(NO_3)_3$): After Mild Thermal Treatment
(Calcined 3 Hr/1200°F in Air)
Bench FCC Tests: 910°F, 2C/0, 12.5 WHSV, WCMCGO

| Run No. | 17 | 18 |
|---|---|---|
| Catalyst of Example | 9 | 10 |
| $RE_2O_3$ Added by Impregnation, % wt | 0 | 2.0 |
| Conversion, % vol | 75.4 | 71.3 |
| $C_5$ + Gasoline, % vol | 57.0 | 59.0 |
| Total $C_4$'s, % vol | 16.7 | 13.8 |
| Dry Gas, % wt | 9.2 | 6.9 |
| Coke, % wt | 5.1 | 3.1 |
| Carbon on Cat., % wt | 2.18 | 1.35 |
| Selectivity ($C_5$ + Gasoline, % vol/Coke, % wt) | 11.2 | 19.0 |
| Hydrogen Factor | 37 | 49 |
| Physical Properties | | |
| Pore Volume, cc/g | 0.70 | 0.68 |
| Packed Density, g/cc | 0.57 | 0.54 |
| Surface Area, m²/g | 351 | 349 |
| Chemical Properties | | |
| $Na_2O$, % wt | 0.40 | — |
| $RE_2O_3$, % wt | 3.40 | 5.40 |

Referring to Runs 17 and 18 in Table 4, the substantially decreased coke make and increased yield of $C_5$ + Gasoline for the catalyst of Example 10, which was subjected to the impregnation step, as compared with

21 those values for the control catalyst of Example 9, are readily apparent.

EXAMPLES 11–14

A third and fourth series of catalysts having REY contents of 20 and 25 weight percent, respectively, were prepared. The procedure employed in preparing the catalysts of the third series was as follows. 1628 grams of Georgia Kaolin clay on a dry weight basis were mixed with 94 pounds of deionized water. 8780 grams of Q-brand sodium silicate [$Na_2O(SiO_2)_{3.3}$] were added with stirring over a one half hour period. The clay was uniformly dispersed and coated with sodium silicate. The admixture was then heated to about 120°F., and 449 cc. of concentrated sulfuric acid (96.0 weight percent sulfuric acid) was added at a uniform rate over a period of one half hour, while mixing to adjust the pH to 10.5.

After the foregoing acid addition, the admixture was heat aged at 140°F. for a period of two hours. The pH after the heat ageing was still 10.5. A slurry of sodium zirconium silicate ($Na_2ZrSiO_5$) in sulfuric acid, this slurry having a pH of less than 0.4, was added at a uniform rate over a one half hour period in such amount as to provide a final zirconia ($ZrO_2$) concentration of 2% by weight of the dry catalyst.

The pH of the mixture was then adjusted to between 4.5 and 4.6 by the addition of sulfuric acid over a one half hour period. A dispersion of 68% exchanged REY was added to the mixture (the REY having been pre-tempered as described in Examples 1–8), in such amount as to provide a final REY concentration based on the dry weight of the catalyst, of 20 weight percent.

Thereafter, the product was spray dried and was then twice slurried with water, allowed to settle, and the water decanted. This product was then continuously washed with 20 gallons of 5% ammonium sulfate solution and water washed until substantially free of sulfate ion. The sulfate-free product was exchanged with 315 grams of rare earth chloride in 3150 cc of water and water washed until essentially chloride free. The product was then dried in an oven at 250°F for about 16 hours. A sample of the foregoing dried catalyst was withdrawn and held as a "control". Hence it was not subjected to impregnation. This control catalyst is designated as Example 11.

A 3000 gram sample of the dried catalyst was contacted with rare earth nitrate salt solution the amount of which was sufficient to fill the pores of the catalyst but to leave the surface of the catalyst dry. The solution contained 180 grams of rare earth nitrate in 3000 cc of deionized water to give an additional 1.8 percent by weight of $RE_2O_3$. The impregnated catalyst was then dried in an oven at about 250°F for about 16 hours. This catalyst was designated Example 12.

22

The procedure employed in preparing the catalysts of the fourth series was as follows. 1395 grams of Georgia Kaolin clay on a dry weight basis were mixed with 87 pounds of deionized water. 9477 grams of Q-brand sodium silicate [$Na_2O(SiO_2)_{3.3}$] were added with stirring over a one half hour period. The clay was uniformly dispersed and coated with sodium silicate. The admixture was then heated to about 120°F., and 484 cc. of concentrated sulfuric acid (96.0 weight percent sulfuric acid) was added at a uniform rate over a period of one half hour, while mixing to adjust the pH to 10.4.

After the foregoing acid addition, the admixture was heat aged at 140°F. for a period of two hours. The pH after the heat ageing was still 10.4. A slurry of sodium zirconium silicate ($Na_2ZrSiO_5$) in sulfuric acid, this slurry having a pH of less than 0.4, was added at a uniform rate over a one half hour period in such amount as to provide a final zirconia ($ZrO_2$) concentration of 2% by weight of the dry catalyst.

The pH of the mixture was then adjusted to between 4.5 and 4.6 by the addition of sulfuric acid over a one half hour period. A dispersion of 68% exchanged REY was added to the mixture (the REY having been pre-tempered as described in Examples 1–8), in such amount as to provide a final REY concentration based on the dry weight of the catalyst, of 25 weight percent.

Thereafter, the product was spray dried and was then twice slurried with water, allowed to settle, and the water decanted. This product was then continuously washed with 20 gallons of 5% ammonium sulfate solution and water washed until substantially free of sulfate ion. The resultant product was exchanged with 420 grams of rare earth chloride in 4200 cc. of water and water washed until essentially chloride free. The product was then dried at 250°F. A sample of the foregoing dried catalyst was withdrawn and held as a "control". Hence it was not subjected to impregnation. This control catalyst is designated Example 13.

A 3000 gram sample of the flash dried catalyst was mixed with a solution of rare earth nitrate the amount of which was sufficient to fill the pores of the catalyst but to leave the surface of the catalyst dry. The solution contained 150 grams of rare earth nitrate in 3000 cc. of deionized water to give an additional 1.5 percent by weight of $RE_2O_3$. After the impregnation step, the catalyst was dried at about 250°F. This catalyst was designated Example 14.

Samples of the catalysts of Examples 11–14 were subjected to mild thermal treatment and additional samples of the catalysts of Examples 13 and 14 were subjected to mild steaming.

The foregoing heat treated catalysts were then evaluated for catalytic performance using FCC Bench Tests. The results of the Tests with the mildly thermally treated samples are set out in Table 5. The results of the Tests with the mildly steamed samples are set out in Table 6.

TABLE 5

High Activity Catalysts Impregnated With Rare Earth
(as $RE(NO_3)_3$): After Mild Thermal Treatment
(Calcined 3 Hr/1200°F in Air)
Bench FCC Tests: 910°F, 2 C/O, 12.5 WHSV, WCMCGO

| Run No. | 19 | 20 | 21 | 22 |
|---|---|---|---|---|
| Catalyst of Example | 11 | 12 | 13 | 14 |
| REY, % by weight | 20% | 20% | 25% | 25% |
| $RE_2O_3$ Added by Impregnation, % wt | 0 | 1.8 | 0 | 1.5 |
| Conversion, % vol | 81.8 | 79.1 | 83.9 | 82.6 |

TABLE 5-continued

High Activity Catalysts Impregnated With Rare Earth
(as RE(NO₃)₃): After Mild Thermal Treatment
(Calcined 3 Hr/1200°F in Air)
Bench FCC Tests: 910°F, 2 C/O, 12.5 WHSV, WCMCGO

| Run No. | 19 | 20 | 21 | 22 |
| --- | --- | --- | --- | --- |
| $C_5$ + Gasoline, % vol | 58.4 | 62.0 | 55.6 | 61.8 |
| Total $C_4$'s, % vol | 18.4 | 16.7 | 19.8 | 17.5 |
| Dry Gas, % wt | 11.5 | 8.8 | 13.4 | 10.6 |
| Coke, % wt | 6.5 | 4.3 | 8.3 | 5.7 |
| Carbon on Cat., % wt | 2.76 | 1.85 | 3.51 | 2.47 |
| Selectivity ($C_5$ + Gasoline, % vol/Coke, % wt) | 9.0 | 14.4 | 6.7 | 10.8 |
| Hydrogen Factor | 33 | 39 | 28 | 31 |
| Physical Properties | | | | |
| Pore Volume, cc/g | 0.71 | 0.71 | 0.86 | 0.86 |
| Packed Density, g/cc | 0.44 | 0.44 | 0.43 | 0.43 |
| Surface Area, m²/g | 399 | 367 | 392 | 379 |
| Chemical Properties | | | | |
| $Na_2O$, % wt | 0.11 | 0.12 | 0.15 | 0.13 |
| $RE_2O_3$, % wt | 4.70 | 6.50 | 5.80 | 7.30 |

Table 6

High Activity Catalysts 25% REY
Impregnation With Rare Earth (as RE(NO₃)₃):
After Mild Steam Treatment (4 Hr/1400°F/0 psig)
Bench FCC Tests: 925°F, 3 C/O, 8.3 WHSV, WCMCGO

| Run No. | 23 | 24 |
| --- | --- | --- |
| Catalyst of Example | 13 | 14 |
| $RE_2O_3$ Added by Impregnation, % wt | 0 | 1.5 |
| Conversion, % vol | 85.0 | 84.7 |
| $C_5$ + Gasoline, % vol | 63.8 | 65.3 |
| Total $C_4$'s, % vol | 19.1 | 18.3 |
| Dry Gas, % wt | 10.4 | 9.6 |
| Coke, % wt | 5.5 | 5.1 |
| Carbon on Cat., % wt | 1.58 | 1.46 |
| Selectivity ($C_5$ + Gasoline, % vol/Coke, % wt) | 11.5 | 12.8 |
| Hydrogen Factor | 16 | 18 |
| Physical Properties | | |
| Pore Volume, cc/g | 0.78 | 0.78 |
| Packed Density, g/cc | 0.46 | 0.47 |
| Surface Area, m²/g | 247 | 266 |
| Chemical Properties | | |
| $Na_2O$, % wt | 0.15 | 0.13 |
| $RE_2O_3$, % wt | 5.80 | 7.30 |

Referring to Table 5, it is appparent that even with "high activity" catalyst, i.e., high levels of rare earth zeolite, the impregnated catalysts of the present invention result in superior gasoline selectivity with a substantial reduction in coke make, as is evident by comparing the results of Runs 20 and 22 with those of runs 19 and 21, respectively.

Referring to Table 6, it is clear that even after mild steaming, the impregnated catalyst of the present invention, i.e., the catalyst of Example 14, possesses a better selectivity than does the non-impregnated catalyst of Example 13.

EXAMPLES 15–16

Whereas the previous examples illustrated the impregnation technique of the present invention as applied to catalyst composites that, prior to impregnation had been subject to post exchange with rare earth ions, the present examples illustrate the impregnation technique of the invention as applied to a catalyst composite that was not previously subject to rare earth post exchange.

Two catalysts were prepared. The procedure employed was as follows:

2,125 pounds of Georgia Kaolin clay on a dry weight basis were mixed with 54,400 pounds (6550 gallons) of deionized water. 11,100 pounds (960 gallons) of Q-brand sodium silicate [Na₂O)SiO₂)₃.₃ containing 3,200 pounds of SiO₂ were added to the water-clay slurry with stirring over a period of one half hour. The clay was uniformly dispersed and coated with sodium silicate. The admixture was then heated to 120°F, and sulfuric acid (35%) was added at a uniform rate, while mixing, to adjust the pH to 9.8.

After the foregoing acid addition, in each instance, the admixture was heat aged for one hour at a temperature sufficient to produce a catalyst with a pore volume of 0.65–0.71 cc/g. An aqueous solution of aluminum sulfate (20 weight percent aluminum sulfate) was then added to the aged mixture at a uniform rate over a period of one half hour in such amount so as to provide a final alumina content of 0.6 percent by weight, based on the total dry catalyst weight.

A slurry was prepared by mixing 19 gallons of 66° Baume sulfuric acid into a dispersion of 240 pounds of sodium zirconium silicate (Na₂ZrSiO₅) in 270 gallons of deionized water. This slurry, which had a pH less than 0.4, was added at a uniform rate over a period of 30 to 45 minutes in such amount as to provide a final concentration of zirconia (ZrO₂) of 2.0 weight percent, based on the weight of the dry catalyst.

The pH of the mixture was then adjusted to between 4.5 and 4.6 by the addition of 35% sulfuric acid over a one half hour period.

600 pounds of REY that previously had been 68% exchanged, i.e., 68% of the sodium content had been replaced with rare earth cations, which previously had been pretempered by calcining at about 1200°F for about ten minutes, were slurried in about 210 gallons of deionized water. (The REY had the following composition: Al₂O₃ = 19.9%; SiO₂ = 60.3%; RE₂O₃ = 15.5%; Na₂O = 4.3%). This slurry was added to the silica-alumina-zirconia-clay slurry while mixing, in such amount as to provide a final REY concentration, based on the dry weight of the catalyst, of 10% by weight.

The blend was filtered. The filter cake was spray dried at 1400–1500 psig to yield a coarse grade catalyst. The spray dried product was ion exchanged with ammonium sulfate solution and then washed with deionized water until substantially free of sulfate ions.

A portion of the foregoing sulfate ion free product was exchanged with an aqueous rare earth chloride solution ($RECl_3·6H_2O$) in such proportions that about 20 parts of rare earth chloride contacted about 2000 parts of catalyst (bone dry basis). After the exchange, the catalyst was water-washed until essentially chloride free and the sulfate content was 0.5% by weight or less on a dry basis. The thus treated catalyst had an $Na_2O$ content of from about 0.11 to 0.16% by weight on a dry basis. After washing, the catalyst was dried at 250°F. This dried catalyst served as a "control". Hence, it was not subjected to impregnation. This control catalyst is designated as Example 15. The control catalyst had the following composition: 10 parts rare earth Y crystalline aluminosilicate zeolite (REY) and 90 parts matrix, the matrix being made up of 40 parts clay, 57.4 parts silica, 2 parts zirconia, and 0.6 part alumina.

A second portion of the foregoing $NH_4^+$ exchanged sulfate free product was further treated to effect rare earth impregnation. Thus, 2300 grams of wet product (55% solids) were contacted with a solution of 263 grams of $RE(NO_3)_3·6H_2O$ in 2760 cc deionized water, the concentration of the foregoing solution having been selected so as to result in the desired rare earth pickup (about 3 percent by weight, expressed as $RE_2O_3$ [dry basis] over and above the rare earth already present). The mixture was then filtered and the product dried at 250°F. This product is designated as Example 16. It had the following composition: 10 parts REY; 90 parts matrix, the matrix being made up of 40 parts clay, 57.4 parts silica, 2 parts zirconia, and 0.6 part alumina; and 2.8 parts $RE_2O_3$ (1.6 parts in excess of the amount achieved by ion exchange).

Samples of the products of Examples 15 and 16 were subjected to thermal treatments of varying degrees of severity, and were then evaluated for catalytic performance, the thermal treatments and catalytic evaluation procedure having been described previously. The results are set out in Table 6A.

The data in Table 6A show that the catalyst of Example 16 consistently gave superior yields of $C_5$+Gasoline and a lower coke make as compared to the corresponding values obtained with the catalyst of Example 15.

EXAMPLE 17 AND 18

Two catalysts were prepared, one employing a rare earth post exchange, the other not utilyzing such post exchange but instead, employing a rare earth impregnation step in accordance with the present invention.

The procedure employed in preparing the two catalysts was as follows: 1860 grams of Georgia Koalin clay on a dry weight basis were mixed with 85 pounds of deionized water. 8000 grams of Q-brand sodium silicate [$Na_2O(SiO_2)_{3.3}$] were added to the water-clay slurry with stirring over a period of one half hour. The clay was uniformly dispersed and coated with sodium silicate. The admixture was then heated to 120°F, and 410 cc of concentrated sulfuric acid (97.2%) were added at a uniform rate, while mixing, over a period of one hour. The pH was then determined to be 10.3.

After the foregoing acid addition, in each instance, the admixture was heat aged for two hours at 140°F, after which the pH was determined to be 10.1. An aqueous solution of aluminum sulfate (20 weight percent aluminum sulfate) was then added to the aged admixture at a uniform rate over a period of one half hour in such amount so as to provide a final alumina content of 0.6 weight percent, based on the total dry catalyst weight.

A slurry was prepared by mixing 115cc of concentrated sulfuric acid (97.2%) into a dispersion of 178 grams of sodium zirconium silicate ($Na_2ZrSiO_5$) in 1730 cc of deionized water. This slurry, which had a pH less than 0.4, was added at a uniform rate over a period of 30 minutes in such amount as to provide a final concentration of zirconia ($ZrO_2$) of 2.0 weight percent, based on the weight of the dry catalyst. The pH was then determined to be 9.0.

The pH of the mixture was then adjusted to between 4.5 and 4.6 by the addition of sulfuric acid over a one half hour period.

697 grams of a slurry of NaY in deionized water (57.8% solids) were added to the silica-alumina-zirconia-clay slurry while mixing. The pH was determined

TABLE 6A

| | BENCH FCC TESTS: 925°F, 2.4 MIN-ON-STREAM WCMCGO | | | | | |
|---|---|---|---|---|---|---|
| | Calcined 3 Hr./1200°F. | | Steamed 4 Hr/1400°F.O psig | | 5 Hr/1400°F/15 psig | |
| Catalyst of Example No. | 15 | 16 | 15 | 16 | 15 | 16 |
| WHSV | 12.5 | 12.5 | 8.33 | 8.33 | 8.33 | 8.33 |
| C/O | 2 | 2 | 3 | 3 | 3 | 3 |
| $RE_2O_3$ by Impregnation | — | 2.8 | — | 2.8 | — | 2.8 |
| $RE_2O_3$ by Exchange | 1.2 | — | 1.2 | — | 1.2 | — |
| Conversion, % vol. | 67.3 | 68.4 | 73.1 | 74.6 | 61.3 | 63.9 |
| $C_5$+ Gasoline, % vol. | 52.3 | 56.7 | 61.4 | 64.3 | 52.7 | 55.3 |
| Total $C_4$'s, % vol. | 14.4 | 13.5 | 13.9 | 13.6 | 11.1 | 11.5 |
| Dry Gas, % wt. | 7.5 | 6.5 | 6.5 | 6.5 | 5.2 | 5.3 |
| Coke, % wt. | 3.8 | 2.8 | 2.6 | 2.4 | 2.1 | 2.0 |
| Carbon On Cat., % wt. | 1.62 | 1.23 | 0.75 | 0.68 | 0.61 | 0.59 |
| $C_5$+ and Alky Gasoline, % vol. | 70.3 | 74.6 | 80.3 | 83.4 | 67.8 | 71.5 |
| Physical Properties | | | | | | |
| Pore Volume, cc/g | 0.65 | 0.62 | 0.55 | 0.56 | 0.53 | 0.52 |
| Packed Density, g/cc | 0.50 | 0.51 | 0.60 | 0.59 | 0.59 | 0.60 |
| Surface Area, m²/g | 368 | 383 | 227 | 241 | 147 | 145 |
| Chemical Properties | | | | | | |
| $Na_2$, % wt. | 0.08 | 0.08 | | | | |
| $RE_2O_3$, % wt. | 2.7 | 4.3 | | | | | to be 5.0. Sufficient concentrated sulfuric acid was added to reduce the pH to 4.5.

The blend was spray dried, and the dried product was slurried with water, permitted to settle, and the water was decanted. The water slurrying, settling, and decantation were repeated. The product was then ion exchanged with ammonium sulfate solution and then washed with deionized water until substantially free of sulfate ions. The resultant product was then divided into two portions.

The first portion was exchanged with an aqueous rare earth chloride solution ($RECl_3 \cdot 6H_2O$). After the exchange, the catalyst was water washed until essentially chloride free and the sulfate content was 0.5% by weight or less on a dry basis. The thus treated catalyst had an $Na_2O$ content of 0.42% by weight on a dry basis. After washing, the catalyst was dried in an oven at 250°F. for about 16 hours. A sample of the foregoing dried catalyst was withdrawn and served as a "control", hence it was not subjected to impregnation. This control catalyst is designated as Example 17.

Another sample of the dried catalyst was then subjected to an impregnation treatment. This treatment comprised slurrying the dried catalyst in a solution made up of 450 grams of rare earth nitrate, ($RE(NO_3)_3 \cdot 6H_2O$ in 7000 cc of deionized water, so as to result in approximately 4 weight percent of $RE_2O_3$. The product was then filtered on a Buchner funnel, followed by drying at 250°F. The dried catalyst is designated as Example 18.

The foregoing catalysts were then subjected to thermal treatment, followed by evaluation for catalytic performance, the data being set out in Table 7.

EXAMPLE 19

Composite Catalyst Made of Matrix (57.4%, $SiO_2$, 0.6% $Al_2O_3$, 40% clay) Containing Rare Earth-Impregnated REY 86 lbs. of deionized water were admixed with 1860 grams of Georgia Kaolin, and the whole was thoroughly mixed. 8000 grams of Q-Brand sodium silicate were added over a period of one half hour while continuously mixing. The admixture was heated to 120°F and 407 cc of concentrated sulfuric acid (97.8%) were added over a period of one hour to adjust the pH to 10.4. The admixture was heated to 140°F and held at this temperature for 2 hours. Then a solution of 140 grams of $Al_2(SO_4)_3$ in 558 cc of water was added over a one half hour period.

A slurry was prepared by mixing 115 cc of concentrated $H_2SO_4$ (97.8%) into a dispersion of 178 grams of sodium zirconium silicate ($Na_2ZrSiO_5$) in 1730 cc of deionized water. This slurry was added at a uniform rate over a period of 30 to 45 minutes in such amount as to provide a final concentration of zirconia ($ZrO_2$) of 2.0 percent by weight, based on the weight of the dry catalyst.

The pH of the mixture was then adjusted to 4.5 by the addition of concentrated sulfuric acid (97.8%) over a one half hour period.

Previously, a rare earth-impregnated REY had been prepared as follows:

A rare earth solution containing 433 grams of $RECl_3 \cdot 6H_2O$ in 500 grams of deionized water was added to 1000 grams of 68% rare earth-exchanged RENaY, which previously had been pretempered by

TABLE 7

| Bench FCC Tests: 925°F, 2.4 Min-on-Stream, WCMCGO | | | | |
|---|---|---|---|---|
| | Calcined 3 Hr./1200°F | | Steamed 4 Hr/1400°F/0 psig | |
| Catalyst of Example No. | 17 | 18 | 17 | 18 |
| C/O | 2 | 2 | 3 | 3 |
| $RE_2O_3$ by Exchange, % wt. | 2.3 | — | 2.3 | — |
| $RE_2O_3$ by Impregnation, % wt. | — | 4.3 | — | 4.3 |
| Conversion, % vol. | 66.8 | 62.2 | 56.4 | 66.3 |
| $C_5$+Gasoline, % vol. | 52.4 | 54.8 | 47.2 | 56.4 |
| Total $C_4$'s, % vol. | 13.8 | 9.7 | 10.6 | 12.6 |
| Dry Gas, % wt. | 7.5 | 4.8 | 5.0 | 5.7 |
| Coke, % wt. | 4.0 | 2.9 | 2.3 | 2.4 |
| Carbon on Cat., % wt. | 1.75 | 1.22 | 0.68 | 0.69 |
| Hydrogen Factor | 55 | 85 | 35 | 49 |
| Physical Properties | | | | |
| Pore vol., cc/g | 0.70 | 0.68 | 0.62 | 0.61 |
| Packed Density, g/cc | 0.47 | 0.47 | 0.52 | 5.51 |
| Surface Area, m²/g | 313 | 295 | 174 | 201 |
| Chemical Properties | | | | |
| $Na_2O$, % wt. | 0.42 | 0.34 | | |
| $Re_2O_3$, % wt. | 2.3 | 4.3 | | |
| $ZrO_2$, % wt. | ~2.0 | ~2.0 | | |

The data in Table 7 show the superior performance attainable by the use of the catalyst of Example 18. Thus, for fresh catalyst (3 hr/1200°F/air) note the increased yield of gasoline and the decrease yields of dry gas, C4's, and coke. Moreover, the catalyst of Example 18 shows distinctly superior stability to steaming.

calcining between 1000° and 1200°F for about 10 minutes, to thereby form a wet powder. The wet powder was then dried overnight at 250°F., and then was calcined for 3 hours at 1200°F. in air to produce a rare earth-impregnated RENaY.

444 grams of the rare earth-impregnated RENaY were slurried in 1400 cc of deionized water. This slurry was added to the silica-zirconia-alumina-clay slurry while mixing, to provide a final overall REY concentration, based on the dry weight of the catalyst, of 10 percent.

The blend was spray dried and the product was ion exchanged with an ammonium sulfate solution and then washed with deionized water until substantially free of sulfate ions. The resultant product was exchanged with a solution of 140 grams of $RECl_3·6H_2O$ in 14,000 cc of water in such proportion that about 20 parts of rare earch chloride contacted about 2000 parts of catalyst (dry basis). After the exchange, the catalyst was water washed until essentially chloride free. The catalyst was then dried at 250°F. for about 16 hours.

EXAMPLE 20

Rare Earth Impregnated Composite Catalyst Made of Matrix (57.4% $SiO_2$, 2% $Zro_2$, 0.6% $Al_2O_3$, 40% clay) Having REY Dispersed Therein.

A catalyst was prepared as follows:

2125 lbs of Georgia Kaolin clay on a dry weight basis were mixed with 54,400 lbs (6550 gallons) of deionized water. 11,100 lbs (960 gallons) of Q-brand sodium silicate $[Na_2O(SiO_2)_{3.3}]$ containing 3200 pounds of $SiO_2$ were added to the water-clay slurry with stirring over a period of one half hour. The clay was uniformly dispersed and coated with sodium silicate. The admixture was then heated to 120°F., and sulfuric acid (35%) was added at a uniform rate, while mixing, to adjust the pH to about 10.4

After the foregoing acid addition, the admixture was heat aged for one hour at a temperature sufficient to produce a catalyst with a pore volume of 0.65–0.71 cc/g. An aqueous solution of aluminum sulfate (20 weight percent aluminum sulfate) was then added to the aged admixture at a uniform rate over a period of one half hour in such amount so as to provide a final alumina content of 0.6 weight percent, based on the total dry catalyst weight.

A slurry was prepared by mixing 19 gallons of 66° Baume sulfuric acid into a dispersion of 240 lbs of sodium zirconium siliciate ($Na_2ZrSiO_5$) in 270 gallons of deionized water. This slurry, which had a pH less tha 0.4, was added at a uniform rate over a period of 30 to 45 minutes in such amount as to provide a final concentration of zirconia ($ZrO_2$) of 2.0 weight percent, based on the weight of the dry catalyst.

The pH of the mixture was then adjusted to between 4.5 and 4.6 by the addition of 35% sulfuric acid over a one half hour period 600 pounds of REY that previously had been 68% exchanged, i.e., 68% of the sodium content had been replaced with rare earth cations, which previously had been pretempered by calcining at about 1200°F for about ten minutes, were slurried in about 210 gallons of deionized water. (The REY had the following composition:

$Al_2O_3 = 19.9\%$; $SiO_2 = 60.3\%$; $RE_2O_3 = 15.5\%$; $Na_2O = 4.3\%$.)

This slurry was added to the silica-alumina-zirconia-clay slurry while mixing, in such amount as to provide a final REY concentration, based on the dry weight of the catalyst, of 10% by weight.

The blend was filtered. The filter cake was spray dried at 1400–1500 psig to yield a coarse grade catalyst. The spray dried product was ion exchanged with ammonium sulfate solution and then washed with deionized water until substantially free of sulfate ions. The thus treated catalyst had an $Na_2O$ content of from about 0.11 to 0.16% by weight on a dry basis. After washing, the catalyst was flash dried.

1000 grams (about 90% solids) of the above catalyst were slurried into a rare earth solution containing 173 grams of $RECl_3·6H_2O$ dissolved in 4000 cc of deionized water, and the slurry permitted to stand for about 10 minutes. The whole was filtered and the filter cake was dried at 250°F.

The catalysts of Examples 19 and 20 were subjected to thermal treatments of varying degrees of severity, and were evaluated for catalytic performance using FCC Bench Tests. The results are set out in Table 8.

Table 8

Comparison of Method of Incorporating Excess Rare Earth Onto A Catalyst

Bench FCC Tests: Calcined 910°F, 2 C/O, 12.5 WHSV, WCMCGO
Steamed 925°F, 3 C/O, 8.3 WHSV, WCMCGO

| CATALYST EXAMPLE NO. | 19 | 20 | 19 | 20 | 19 | 20 |
|---|---|---|---|---|---|---|
| Catalyst Treatment | Calcined 3 Hrs-1200°F-Air | | Steamed 4 Hrs-1400°F-0 psig | | Steamed 5 Hrs-1500°F-15 psig | |
| Method of Rare Earth Impregnation | On REY | On Finished Catalyst | On REY | On Finished Catalyst | On REY | On Finished Catalyst |
| Conversion, % Vol. | 66.0 | 68.4 | 72.8 | 74.5 | 55.0 | 63.9 |
| $C_5$ + Gasoline, % vol. | 55.2 | 56.7 | 63.0 | 63.8 | 48.4 | 55.3 |
| Total $C_4$'s, % vol. | 12.5 | 13.5 | 13.1 | 15.4 | 9.1 | 11.5 |
| Dry Gas, % wt. | 6.2 | 6.5 | 6.1 | 5.0 | 4.2 | 5.3 |
| Coke, % wt. | 2.7 | 2.8 | 2.4 | 2.5 | 1.4 | 2.0 |
| Chemical Properties $Na_2O$, % wt. | 0.12 | 0.07 | | | | |
| Total $RE_2O_3$, % wt. | 3.7 | 4.3 | | | | |
| Impregnated $RE_2O_3$, % wt. | 1.4 | 2.0 | | | | |

Referring to Table 8, the superior performance of the catalyst of Example 20 to that of the catalyst of Example 19 is evident. In each instance, the catalyst of Example 20 was characterized by a higher conversion and by a higher yield of $C_5$+ gasoline.

EXAMPLE 21

Rare Earth Impregnated Composite Catalyst Made of Matrix (57.4% $SiO_2$, 2% $ZrO_2$, 0.6% $Al_2O_3$, 40% clay) Having REY Dispersed Therein A catalyst was prepared as described in Example 1, this catalyst having the following composition: 10% REY and 90% matrix, the matrix being made up of 40% clay, 57.4% silica, 2% zirconia, and 0.6% alumina. 1000 grams (about 90% solids) of this catalyst were slurried into a rare earth solution containing 200 grams of $RECl_3·6H_2O$ dissolved in 4000 cc of deionized water, and the slurry was permitted to stand for about ten minutes. The whole was filtered and the filter cake was dried at 250°F.

The catalysts of Examples 19 and 21 were subjected to a mild steam treatment and were evaluated for catalytic performance using FCC Bench Tests. The results are set out in Table 9.

Table 9

Sensitivity to Residual Coke

Catalyst Steamed 4 Hrs - 1400°F - 0 psig
Bench FCC Tests: 925°F, 2.4 minutes on-stream time, WCMCGO

| Catalyst of Example No. | 19 | | 21 | |
|---|---|---|---|---|
| Catalyst Description | Impregnation On REY | | Impregnation On Finished Catalyst | |
| Catalyst/Oil, wt/wt | 3 | | 5 | |
| % Wt Carbon at Start | 0.00 | 0.37 | 0.00 | 0.27 |
| Conv, % vol | 72.8 | 56.1 | 78.5 | 72.7 |
| $C_5$+ Gasoline, % vol | 63.0 | 50.3 | 65.3 | 62.1 |
| Total $C_4$'s, % vol | 13.1 | 9.1 | 15.3 | 12.7 |
| Dry Gas, % wt | 6.1 | 4.2 | 7.7 | 6.1 |
| Coke, % wt | 2.4 | 1.7 | 3.0 | 1.7 |
| Activity Loss/0.1% Residual Carbon | | 4.5 | | 2.1 |
| Chemical Properties | | | | |
| $Na_2O$, % wt | 0.12 | | 0.10 | |
| $RE_2O_3$, % wt | 3.7 | | 4.5 | |
| Total Impregnated $RE_2O_3$, % wt | 1.4 | | 2.2 | |

Referring to Table 9, it is evident that the catalyst of Example 21 gave superior performance as contrasted to that of Example 19. Note the markedly lower loss of activity with residual carbon for Example 21 as compared to Example 19, and the distinctly higher yield of $C_5$+ gasoline.

EXAMPLES 22 AND 23

These two examples compare the performances of a rare earth-exchanged catalyst and a rare earth-impregnated catalyst, each employing in the matrix silica gelled at a low pH.

To 85.8 lbs of deionized water were added 636 cc of $H_2SO_4$ (96.2%). 1860 grams of Georgia SAF Kaolin were added and the whole was thoroughly mixed.

Sufficient Q-Brand sodium silicate was slowly added with mixing to raise the pH to 4.7.

458 grams of calcined REY (95.7% solids; analysis: 58.3% $SiO_2$, 19.8% $Al_2O_3$, 3.6% $Na_2O$, 16.1% $RE_2O_3$) were slurried in 1400 cc of water containing 2.66 grams of ligno sulfonate dispersant ("Marosperse N"), to give a 10% REY slurry. This slurry was added. Sufficient Q-Brand sodium silicate was added to adjust the pH to 8.0.

The whole was heated to 120°F and held at this temperature for 10 minutes.

An aqueous aluminum sulfate solution (20%) was added in sufficient quantity over a one-half hour period with mixing to give an aluminum content in the final product, on a dry basis, of 0.6% $Al_2O_3$.

A sodium zirconium silicate was prepared as described in Example 19. This slurry was added at a uniform rate over a period of about 35–45 minutes in such amount as to provide a final concentration of zirconia ($ZrO_2$) of 2.0% by weight, based on the weight of the dry catalyst.

The pH of the mixture was then adjusted to 4.5 by the addition of aqueous sodium hydroxide (50.9%).

The blend was then homogenized, spray dried, ion exchanged with ammonium ions, and water washed as described in Example 19.

The foregoing product was divided into two portions. The first portion was ion exchanged with rare earth ions and dried as described in Example 19. The resulting product served as a catalyst of Example 22.

The remaining portion was subjected to rare earth impregnation. To that end, 375 grams of $RECl_3·6H_2O$ were dissolved in 5000 cc of deionized water. To this was added said remaining portion (wet cake obtained after the ammonium exchange and water wash). The whole was thoroughly mixed for one hour and then filtered. The resulting filter cake was dried at 250°F. The resulting product served as the catalyst for Example 23.

The catalysts of Examples 22 and 23 were subjected to a thermal treatment as set out in Table 10, and were then evaluated for catalyst performance using FCC Bench Tests. The results are set out in Table 10.

Table 10

Effect of Excess Rare Earth By Impregnation On A Catalyst Prepared From Silica Gelled at Low pH Catalyst Calcined 3 Hrs-1200°F-Air
Bench FCC Test: 910°F, 2C/O, 12.5 WHSV, WCMCGO

| Catalyst of Example No. | 22 | 23 |
|---|---|---|
| Excess Rare Earth, % Wt. | 0.0 | 2.3 |
| Conversion, % vol | 63.7 | 61.8 |
| $C_5$+ Gasoline, " | 49.9 | 52.6 |
| Total $C_4$'s, " | 15.4 | 13.3 |
| Dry Gas, % Wt | 7.1 | 5.4 |
| Coke, % Wt | 3.9 | 2.5 |
| Carbon on Catalyst, % wt | 1.63 | 1.07 |
| Chemical Properties | | |
| $Na_2O$, % wt | 0.05 | 0.08 |
| $RE_2O_3$, " | 2.6 | 4.9 |

Referring to Table 10, the superior performance of the catalyst of Example 23 is readily apparent. Thus, notwithstanding the slightly lower percent conversion, the catalyst of Example 23 gave a distinctly higher yield of $C_5$ plus gasoline, and additionally gave a lower percent coke and a lower percent carbon on the catalyst.

EXAMPLES 24–25

Two catalysts were prepared, each having the following composition: 10% rare earth Y crystalline aluminosilicate zeolite (REY) and 90% matrix, the matrix being made up of 40% clay, 58% silica, and 2% zirconia.

The procedure employed in preparing the catalysts was as follows: 1860 grams of Georgia Kaolin clay on a dry weight basis were mixed with 87 pounds of deionized water. 8063 grams of Q-brand sodium silicate [$Na_2O(SiO_2)_{3.3}$] were added to the water-clay slurry with stirring over a period of one half hour. The clay was uniformly dispersed and coated with sodium silicate. The admixture was then heated to 120°F, and sulfuric acid (96.5%) was added at a uniform rate, while mixing, to adjust the pH to 10.5.

After the foregoing acid addition, the admixture was heat aged at 140°F. for a time sufficient to produce a catalyst with a pore volume of 0.65–0.71 cc/g. The pH was 11.3.

A slurry was prepared by mixing 115 cc of sulfuric acid (96.5%) into a dispersion of 178 grams of sodium zirconium silicate ($Na_2ZrSiO_5$) in 1730 cc of deionized water. This slurry, which had a pH less than 0.4, was added at a uniform rate over a period of 30 to 45 minutes in such amount as to provide a final concentration of zirconia ($ZrO_2$) of 2.0 weight percent, based on the weight of the dry catalyst.

The pH of the mixture was then adjusted to 4.5 by the addition of 96.5% sulfuric acid over a one half hour period.

454 grams of calcined REY that previously had been 68% exchanged, i.e., 68% of the sodium content had been replaced with rare earch cations, which previously had been pretempered by calcining at about 1200°F. for about ten minutes, were slurried in about 1400 cc of deionized water. (The REY was 96.3% solids and had the following composition: $Al_2O_3$=19.2%; $SiO_2$=59.5%, $RE_2O_3$=15.3%; $Na_2O$=4.0%). This slurry was added to the silica-zironcia-clay slurry while mixing, in such amount as to provide a final REY concentration, based on the dry weight of the catalyst, of 10% by weight.

The blend was homogenized and then spray dried. The spray dried product was ion-exchanged with ammonium sulfate solution and then washed with deionized water until substantially free of sulfate ions. The resultant product was exchanged with an aqueous rare earth chloride solution ($RECl_3 \cdot 6H_2O$) in such proportions that about 20 parts of rare earth chloride contacted about 2000 parts of catalyst (bone dry basis). After the exchange, the catalyst was water washed until essentially chloride free and the sulfate content was 0.5% by weight or less on a dry basis. The thus treated catalyst had an $Na_2O$ content of about 0.1% by weight on a dry basis. (After washing, the catalyst was oven dried at 260°F. A sample of the foregoing oven dried catalyst was withdrawn and held as a "control". Hence, it was not subjected to impregnation. This control catalyst is designated as Example 24.

A second sample of the dried catalyst was subjected to an impregnation treatment. This treatment comprised mixing 5000 grams of sample with a solution of 375 grams of $RECl_3 \cdot 6H_2O$ in 5000 cc of deionized water for one hour, followed by filtration and oven drying at 260°F. (with no intermediate wash between the filtration and drying). The resulting impregnated catalyst is designated as Example 25.

EXAMPLES 26–27

Two catalyst were prepared, each having the following composition: 10% rare earth Y crystalline aluminosilicate zeolite (REY) and 90% matrix, the matrix being made up of 40% clay, 58% silica, and 2% alumina.

The procedure employed in preparing the catalysts was as follows: 1860 grams of Georgia Kaolin clay on a dry weight basis were mixed with 87 pounds of deionized water. 8083 grams of Q-brand sodium silicate [$Na_2O(SiO_2)_{3.3}$] were added to the water-clay slurry with stirring over a period of one half hour. The clay was uniformly dispersed and coated with sodium silicate. The admixture was then heated to 120°F, and sulfuric acid 96.5% was added at a uniform rate, while mixing, to adjust the pH to 10.5.

After the foregoing acid addition, the admixture was heat aged at 140°F. for a time sufficient to produce a catalyst with a pore volume of 0.65–0.71 cc/g. The pH was 11.3.

An aqueous solution of aluminum sulfate (20 weight percent aluminum sulfate) was then added to the aged admixture at a uniform rate over a period of one half hour in such amount so as to provide a final alumina content of 2 weight percent, based on the total dry catalyst weight. The pH was 9.1.

The pH of the mixture was then adjusted to 4.5 by the addition of 96.5% sulfuric acid over a one half hour period.

458 grams of calcined REY that previously had been 68% exchanged, i.e., 68% of the sodium content had been replaced with rare earth cations, which previously had been pretempered by calcining at 1200°F. for about ten minutes, were slurried in about 1400 cc of deionized water. (The REY was 96.3% solids and had the following composition: $Al_2O_3$=19.2%; $SiO_2$=59.5%; $RE_2O_3$=15.3%; $Na_2O$=4.0%). This slurry was added to the silicaalumina-clay slurry while mixing, in such amount as to provide a final REY concentration, based on the dry weight of the catalyst, of 10% by weight.

The blend was homogenized and spray dried. The spray dried product was ion exchanged with ammonium sulfate solution and then washed with deionized water until substantially free of sulfate ions. The sulfate free product was exchanged with an aqueous rare earth chloride solution ($RECl_3 \cdot 6H_2O$) in such proportions that about 20 parts of rare earth chloride contacted about 2000 parts of catalyst (bone dry basis). After the exchange, the catalyst was water washed until essentially chloride free and the sulfate content was 0.5% by weight or less on a dry basis. The thus treated catalyst had an $Na_2O$ content of about 0.10% by weight on a dry basis. After washing the catalyst was oven dried at 260°F. A sample of the foregoing dried catalyst was withdrawn and held as a "control". Hence, it was not subjected to impregnation. This control catalyst is designated as Example 26.

A second sample of the dried catalyst was subjected to an impregnation treatment. This treatment comprised mixing 5000 grams of sample with a solution of 375 grams of $RECl_3 \cdot 6H_2O$ in 5000 cc of deionized water for one hour, followed by filtration and oven drying at 260°F. (with no intermediate wash between the filtration and drying). The resulting impregnated catalyst is designated as Example 27.

EXAMPLES 28–29

Two catalysts were prepared, each having the following composition: 10% rare earth Y crystalline aluminosilicate zeolite (REY) and 90% matrix, the matrix being made up of 40% clay, 55% silica, and 5% alumina.

The procedure employed in preparing the catalysts was as follows: 1860 grams of Georgia Kaolin clay on a dry weight basis were mixed with 87 pounds of deionized water. 7639 grams of Q-brand sodium silicate [$Na_2O(SiO_2)_{3.3}$] were added to the water clay slurry with stirring over a period of one half hour. The clay was uniformly dispersed and coated with sodium silicate. The admixture was then heated to 120°F, and sulfuric acid (96.5%) was added at a uniform rate, while mixing, to adjust the pH to 10.4.

After the foregoing acid addition, the admixture was heat aged at 140°F. for time sufficient to produce a catalyst with a pore volume of 0.65–0.71 cc/g. The pH was 11.0. An aqueous solution of aluminum sulfate (20 weight percent aluminum sulfate) was then added to the aged admixture at a uniform rate over a period of one half hour in such amount so as to provide a final alumina content of 5 weight percent, based on the total dry catalyst weight. The pH was 3.9.

The pH of the mixture was then adjusted to 4.5 by the addition of saturated sodium carbonate over a one half hour period.

454 grams of calcined REY that previously had been 68% exchanged, i.e., 68% of the sodium content had been replaced with rare earth cations, which previously had been pretempered by calcining at about 1200°F. for about ten minutes, were slurried in about 1400 cc of deionozed water. (The REY was 96.3% solids and had the following composition: $Al_2O_3$=19.2%; $SiO_2$=59.5%; $RE_2O_3$=15.3%; $Na_2$=4.0%). This slurry was added to the silica zirconia clay slurry while mixing, in such amount as to provide a final REY concentration, based on the dry weight of the catalyst, of 10% by weight.

The blend was homogenized and spray dried. The spray dried product was ion exchanged with ammonium sulfate solution and then washed with deionized water until substantially free of sulfate ions. The resultant product was exchanged with an aqueous rare earth chloride solution ($RECl_3 \cdot 6H_2O$) in such proportions that about 20 parts of rare earth chloride contacted about 2000 parts of catalyst (bone dry basis). After the exchange, the catalyst was water washed until essentially chloride free and the sulfate content was 0.5% by weight or less on a dry basis. The thus treated catalyst had an $Na_2O$ content of about 0.1% by weight on a dry basis. After washing, the catalyst was dried at 260°F. A sample of the foregoing dried catalyst was withdrawn and held as a "control". Hence, it was not subjected to impregnation. This control catalyst is designated as Example 28.

A second sample of the dried catalyst was subjected to an impregnation treatment. This treatment comprised mixing 5000 grams of sample with a solution of 375 grams of $RECl_3 \cdot 6H_2O$ in 5000 cc of deionized water for one hour, followed by filtration and oven drying at 260°F. (with no intermediate wash between the filtration and drying). The resulting impregnated catalyst is designated as Example 29.

EXAMPLES 30–31

Two catalysts were prepared, each having the following composition: 10% rare earth Y crystalline aluminosilicate zeolite (REY) and 90% matrix, the matrix being made up of 40% clay, 50% silica, and 10% alumina.

The procedure employed in preparing the two catalysts was as follows: 1860 grams of Georgia Kaolin clay on a dry weight basis were mixed with 87 pounds of deionized water. 6944 grams of Q-brand sodium silicate [$Na_2O(SiO_2)_{3.3}$] were added to the water-clay slurry with stirring over a period of one half hour. The clay was uniformly dispersed and coated with sodium silicate. The admixture was then heated to 120°F., and sulfuric acid (96.5%) was added at a uniform rate, while mixing, to adjust the pH to 10.1.

After the foregoing acid addition, the admixture was heat aged at 140°F. for a time sufficient to produce a catalyst with a pore volume of 0.65–0.71 cc/g. The pH was 10.5. An aqueous solution of aluminum sulfate (20 weight percent aluminum sulfate) was then added to the aged admixture at a uniform rate over a period of one half hour in such amount so as to provide a final alumina content of 10 weight percent, based on the total dry catalyst weight. The pH was 3.8.

The pH of the mixture was then adjusted to 4.5 by the addition of sodium carbonate solution over a one half hour period.

454 grams of calcined REY that previously had been 68% exchanged, i.e., 68% of the sodium content had been replaced with rare earth cations, which previously had been pretempered by calcining at about 1200°F. for about ten minutes, were slurried in about 1400 cc of deionized water. (The REY was 96.3% solids and had the following composition: $Al_2O_3$=19.2%; $SiO_2$=59.5%; $RE_2O_3$=15.3: $Na_2O$=4.0%). This slurry was added to the silica-zirconia-clay slurry while mixing, in such amount as to provide a final REY concentration, based on the dry weight of the catalyst, of 10% by weight.

The blend was homogenzied and spray dried. The spray dried product was ion exchanged with ammonium sulfate solution and then washed with deionized water until substantially free of sulfate ions. The sulfate-free product was exchanged with an aqueous rare earth chloride solution ($RECl_3 \cdot 6H_2O$) in such proportions that about 20 parts of rare earth chloride contacted about 2000 parts of catalyst (bone dry basis). After the exchange, the catalyst was water washed until essentially chloride free and the sulfate content was 0.5% by weight or less on a dry basis. The thus treated catalyst had an $Na_2O$ content of about 0.1% by weight on a dry basis. After washing, the catalyst was oven dried at 260°F. A sample of the foregoing dried catalyst was withdrawn and held as a "control". Hence, it was not subjected to impregnation. This control catalyst is designated as Example 30.

A second sample of the dried catalyst was subjected to an impregnation treatment. This treatment comprised mixing 5000 grams of sample with a solution of 375 grams of $RECl_3 \cdot 6 H_2O$ in 5000 cc of deionized water for one hour, followed by filtration and oven drying at 260°F. (with no intermediate wash between the filtration and drying). The resulting impregnated catalyst is designated as Example 31.

COMPARISON OF RARE EARTH EXCHANGED AND RARE EARTH IMPREGNATED CATALYSTS HAVING VARYING MATRIX ALUMINA CONTENTS

The eight catalysts of Examples 24–31 were thermally treated as described in Table 11, and were then evaluated for catalytic performance using FCC Bench Tests. The results are set out in Table 11.

TABLE II

COMPARISON OF RARE EARTH EXCHANGED AND RARE EARTH IMPREGNATED CATALYSTS WITH VARYING MATRIX ALUMINA CONTENT

Catalyst calcined 3 hrs - 1200°F - Air Bench FCC Test: 910°F, 2 C/O, 12.5 WHSV, WCMCGO

| CATALYST OF EXAMPLE NO. | 24 | 25 | 26 | 27 | 28 | 29 | 30 | 31 |
|---|---|---|---|---|---|---|---|---|
| Matrix Alumina, % wt. | 0.0(2% ZrO$_2$) | | 2.0 | | 5.0 | | 10.0 | |
| Excess RE$_2$O$_3$, % wt. | 0.0 | 2.0 | 0.0 | 1.6 | 0.0 | 1.7 | 0.0 | 3.0 |
| Conversion, % vol. | 69.5 | 64.6 | 66.0 | 68.4 | 67.7 | 68.8 | 71.7 | 70.0 |
| C$_5$+Gasoline, % vol. | 56.3 | 56.7 | 51.6 | 58.3 | 54.3 | 57.9 | 55.5 | 58.5 |
| Total C$_4$'s, % vol. | 14.9 | 12.7 | 15.3 | 13.6 | 15.1 | 14.1 | 16.6 | 15.1 |
| Dry Gas, % wt. | 7.6 | 5.3 | 7.7 | 6.6 | 7.4 | 7.0 | 8.6 | 6.8 |
| Coke, % wt. | 3.9 | 2.4 | 3.9 | 2.6 | 3.8 | 3.0 | 4.4 | 3.2 |
| Carbon on Catalyst, % wt. | 1.68 | 1.03 | 1.68 | 1.11 | 1.64 | 1.28 | 1.86 | 1.38 |
| CHEMICAL PROPERTIES | | | | | | | | |
| Na$_2$O, % wt. | 0.04 | 0.05 | 0.07 | 0.07 | 0.05 | 0.05 | 0.05 | 0.07 |
| RE$_2$O$_3$, % wt. | 2.3 | 4.3 | 3.5 | 5.1 | 3.7 | 5.4 | 2.0 | 5.0 |

Referring to Table 11, it is apparent that in each instance the rare earth impregnated catalyst (catalysts of Examples, 25, 27, 29 and 31) was significantly more selective then the corresponding rare earth exchanged catalyst (catalysts of Examples 24, 26, 28 and 30, respectively). These improved results occurred regardless of the particular matrix alumina content. In every case, the rare earth impregnated catalyst gave a distinctly higher yield of C$_5$ plus gasoline as well as a lower percent coke.

EXAMPLE 32

This example illustrates the preparation of a rare earth-impregnated composite by treating a matrix with a rare earth slat solution and thereafter admixing the so-treated matrix with rare earth crystalline aluminosilicate.

The matrix was prepared as follows: 626 lbs. of Magcobar clay (Texas Kaolin) were added to 1750 gallons of water with agitation. Sodium silicate was added in such amount as to result in 900 lbs. of SiO$_2$. The whole was heated with live steam to 100°F. Then aqueous H$_2$SO$_4$ (25%) was added over a 36 minute period in such amount as to give a pH of 9.8, followed by aging for 30 minutes to give a pore volume of 0.6 cc/gm. Aqueous aluminum sulfate (7% Al$_2$O$_3$) was added over a period of not more than ten minutes in such amount as to provide 9.7 lbs. of Al$_2$O$_3$.

Previously a zirconia slurry had been prepared by mixing 19 gallons of 66° Baume sulfuric acid into a dispersion of 240 lbs. of sodium zirconium silicate (Na$_2$ZrSiO$_5$) in 270 gallons of deionized water. This zirconia slurry was added over a period of 30 minutes. Aqueous sulfuric acid (25%) was added in such quantity as to reduce the pH to 3 and the whole was permitted to stand for 15 minutes. The pH was then raised to 4.5 by the addition of concentrated ammonium hydroxide.

About 40 gallons of the foregoing matrix were washed and ion exchanged as follows: 77 grams of "Magnifloc 570-C" (a liquid cationic flocculant manufactured by Cyanamid) dissolved in one liter of deionized water were added. The whole was filtered while washing with deionized water. The filter cake was repulped to 40 gallons with deionized water. The filtering and repulping steps were repeated twice. 1590 grams of ammonium sulfate dissolved in two gallons of deionized water were added and the whole was mixed for 30 minutes. The filtering and repulping steps were repeated twice. 38 grams of "Magnifloc 570-C" dissolved in 0.5 liter of deionized water were added. The filtering and repulping steps were repeated twice. By virtue of the foregoing treatment the sodium content of the matrix was reduced to 0.05 weight percent.

The exchanged matrix was used to prepare two catalysts, A and B, each having the following composition: 85% matrix and 15% rare earth Y crystalline aluminosilicate (REY). Catalyst A was prepared as follows: To 29.9 lbs. of exchanged matrix (13.4 weight percent solids) were added 278 grams of RECl$_3$·6H$_2$O dissolved in 500 cc of distilled water. While mixing, 332 grams of treated REY (97% solids) were added. [The treated REY had been prepared as follows: 2000 grams of REY (95.7% solids, and which analyzed as 58.3% SiO$_2$, 19.8% Al$_2$O$_3$, 3.6% Na$_2$O, 16.1% RE$_2$O$_3$) were slurried with a rare earth chloride solution containing 346 grams of RECl$_3$·6H$_2$O dissolved in 8000 cc of distilled water. The slurry was mixed for one hour at room temperature, followed by filtering, washing with 16,000 cc of distilled water, and calcining at 1200°F. for one hour. The so-treated REY contained 1.1 weight percent Na$_2$O and 20.9 weight percent RE$_2$O$_3$. The mixture was homogenized and spray dried.]

Catalyst B was prepared in a manner similar to that described for Catalyst A, except that the treatment with the rare earth chloride solution was omitted. Thus, to 29.9 lbs. of exchanged matrix were added 332 grams of treated REY, and the mixture was then homogenized and spray dried.

Catalysts A and B were thermally treated as described in Table 12, and were then evaluated for catalytic performance using FCC Bench Tests. The results are given in Table 12.

TABLE 12

RE IMPREGNATION OF MATRIX
Catalysts calcined 3 hours - 1200°F. - Air Bench FCC Test:
910°F, 2 C/O, 12.5 WHSV, WCMCGO

| | Catalyst B | Catalyst A |
|---|---|---|
| RE$_2$O$_3$ added by impregnation, % weight | 0.0 | 6.0 |

TABLE 12-continued

RE IMPREGNATION OF MATRIX

Catalysts calcined 3 hours - 1200°F. - Air Bench FCC Test:
910°F, 2 C/O, 12.5 WHSV, WCMCGO

|  | Catalyst B | Catalyst A |
|---|---|---|
| Conversion, % volume | 77.3 | 71.1 |
| $C_5$ + Gasoline, % volume | 55.8 | 59.9 |
| Total $C_4$'s, % (volume | 19.9 | 14.4 |
| Dry gas, % weight | 9.4 | 6.7 |
| Coke, % weight | 6.5 | 3.8 |
| Carbon on catalyst, % weight | 2.75 | 1.66 |
| Chemical Properties |  |  |
| $Na_2O$, % weight | 0.17 | 0.17 |
| $RE_2O_3$, % weight | 3.1 | 9.0 |

The superior performance of Catalyst A is readily apparent. Note that markedly higher production of $C_5$+ gasoline (59.9 volume % for Catalyst A as against 55.8 volume % for Catalyst B), and the decreased production of other products. That is to say, rare earth-impregnated Catalyst A showed increased gasoline production at the expense of the other products.

EXAMPLE 33

This example illustrates the applicability of our invention to yet other catalysts.

A sample of HFZ-20 was utilized. HFZ-20 is a commercial catalyst. Its properties, as described in the June 19, 1972 issue of "The Oil and Gas Journal" at pages 71–75, are as follows:

| Wt. % $Al_2O_3$ | 55 |
|---|---|
| Wt. % $SiO_2$ | 45 |
| Particle size distrubtion wt.% |  |
| 0 to 20μ | <2 |
| 0 to 40μ | 13 to 20 |
| 0 to 80μ | 78 to 85 |
| 0 to 105μ | 93 to 97 |
| 0 to 149μ | 99 |
| Average particle size | 58 to 64μ |
| Attrition loss | <0.2 wt.%/hr |
| packed-bulk density | 0.86 to 0.90 kg/l |

2500 grams of HFZ-20 (Englehard Minerals & Chemical Corp.) were slurried into a solution of 291.6 grams $RECl_3 \cdot 6H_2O$ dissolved in 8750 cc of deionized water, and the whole was mixed for one hour, followed by filtration and water washing until the effluent was chloride free. The product was dried for 16 hours at 250°F., and then calcined for three hours at 1200°F. in air, to thereby produce a rare earth exchanged HFZ-20.

A 1950 gram portion of the rare earth exchanged HFZ-20 was slurried into a solution of 521 grams $RECl_3 \cdot 6H_2O$ dissolved into 3440 cc water, and the whole was mixed for one hour, followed by filtration and drying (i.e., without an intermediate washing step between filtering and drying). The drying was carried out at 250°F. for 40 hours, resulting in a rare earth-impregnated, rare earth-exchanged HFZ-20.

The bench-scale FCC test results on the calcined catalysts are set out in Table 13.

TABLE 13

EFFECT OF RARE EARTH EXCHANGE AND IMPREGNATION OF HFZ-20

Catalysts calcined at 1200°F. - Air Bench FCC Test:
910°F., 2 C/O, 12.5 WHSV, WCMCGO

|  | Catalyst A | Catalyst B | Catalyst C |
|---|---|---|---|
| Catalyst Description | HFZ-20 | RE Exchanged HFZ-20 | RE Exchanged RE Impregnated HFZ-20 |
| % Wt $RE_2O_3$ by impregnation | 0.0 | 0.0 | 3.9 |
| Conversion, % vol. | 86.1 | 81.7 | 86.1 |
| $C_5$ + Gasoline, % vol. | 50.7 | 40.7 | 58.4 |
| Total $C_4$'s, % vol. | 25.0 | 24.5 | 22.5 |
| Dry gas, % wt. | 14.0 | 15.9 | 11.3 |
| Coke, % wt. | 12.9 | 15.9 | 10.1 |
| Carbon on Catalyst, % wt. | 5.51 | 6.73 | 4.49 |
| Chemical Analyses, % wt. |  |  |  |
| $Na_2O$, % wt. | 1.03 | 0.97 | 0.49 |
| $RE_2O_3$, % wt. | 0.0 | 4.06 | 8.80 |

Referring to Table 13, the superior performance of Catalyst C, containing impregnated rare earth, over both Catalyst B (containing rare earth only by ion exchange) and Catalyst A, (containing no rare earth) is manifest. Note particularly the increased yield of $C_5$'s plus gasoline, as well as the lower carbon on the catalyst.

The remaining examples illustrate the improved results that are obtained when, after rare earth impregnation, the subsequent drying is carried out over a moderately extensive period of time, as described previously at page 30, last paragraph.

EXAMPLE 34

A matrix with the composition 39.9% clay, 57.5% silica, 2% zirconia and 0.6% alumina was prepared as described in Example 32 except the gel was not aged at the 9.8 pH to give a pore volume of 0.5 cc/gm. A slurry (30% solids) containing 267 lbs of REY was added to the matrix to give a composite consisting of 85% matrix and 15% REY. This composite was ion exchanged and washed as a hydrogel in the following manner.

Two gallons of Magnifloc dissolved into 3 gallons of water were added, followed by filtration and washing with deionized water. Repulping was effected with deionized water and the addition of a 15% ammonium sulfate solution so that 4 lbs of ammonium sulfate were used per ton of finished catalyst. This was followed by filtration and washing with deionized water. The repulping step was repeated, followed by repulping with deionized water and the addition of a 15% ammonium sulfate solution so that 8 lbs of ammonium sulfate were used per ton of finished catalyst. An aqueous solution of $RECl_3 \cdot 6H_2O$ was added so as to give 1% wt $RE_2O_3$ on the finished catalyst. This was followed by filtering and washing with deionized water. The product was spray dried using a spinning wheel for atomization. The spray dried catalyst was slurried into a 5% ammonium sulfate solution so that 400 lbs of ammonium sulfate were used per ton of finished catalyst. This was followed by filtering and washing with deionized water. $RECl_3 \cdot 6H_2O$ was added so as to give 3% wt excess $RE_2O_3$ on the finished catalyst.

The foregoing catalyst was divided into two portions, and the final drying was effected by one of two different methods:
 a. spray drying, or
 b. drying in a fixed bed in a muffle furnace at 750°F. for 20 minutes.

The catalytic results on these catalysts, calcined at 1200°F., are set out in Table 14.

TABLE 14

EFFECT OF METHOD OF FINAL DRYING ON RARE EARTH IMPREGNATED CATALYSTS

Catalysts calcined at 1200°F. - Air Bench FCC Test: 910°F., 2 C/O, 12.5 WHSV, WCMCGO

| | Catalyst A | Catalyst B |
|---|---|---|
| Final Drying | Spray Dryer | Muffle at 750°F. |
| Conversion, % vol | 73.9 | 75.3 |
| $C_5$ + Gasoline, % vol | 51.5 | 57.0 |
| Total $C_4$'s, % vol | 18.7 | 18.0 |
| Dry gas, % wt | 10.0 | 8.8 |
| Coke, % wt | 6.8 | 4.6 |
| Carbon on catalyst % wt | 2.92 | 1.97 |

A consideration of Table 14 shows the superior performance of Catalyst B. Note particularly the markedly higher yield of $C_5$+ gasoline.

EXAMPLE 35

A catalyst was prepared by the method described in Examples 9 and 10, with the exception that after the ammonium sulfate exchange the catalyst was contacted with a rare earth chloride solution whose concentration was selected to give the desired rare earth pickup (about 3% by wt). This catalyst was divided into three portions, each being dried in a different manner:
 a. spray drying,
 b. flash drying, rapidly removing the water by placing the filter cake (about 40% solids) in a hot (about 1200°F.) vessel, or
 c. drying in a muffle furnace at various temperatures, namely, 350°F. for 220 minutes, 550°F. for 50 minutes, and 750°F. for 20 minutes.

The catalytic results on these catalysts calcined at 1200°F. are set out in Table 15.

TABLE 15

EFFECT OF DRYING METHOD ON RARE EARTH IMPREGNATED CATALYSTS

Catalysts calcined at 1200°F. - Air Bench FCC Test: 910°F., 2 C/O, 12.5 WSHV, WCMCGO

| | Catalyst A | Catalyst B | Catalyst C | | |
|---|---|---|---|---|---|
| Drying Method | Spray Drying | Flash Drying | 350°F | Muffle at 550°F | 750°F |
| Conversion, % vol | 73.0 | 72.4 | 75.4 | 72.7 | 67.8 |
| $C_5$ + Gasoline, % vol | 53.5 | 52.0 | 61.8 | 61.1 | 57.6 |
| Total $C_4$'s, % vol | 19.1 | 17.6 | 16.5 | 15.3 | 14.4 |
| Dry gas, % wt | 9.2 | 9.8 | 7.9 | 7.1 | 6.3 |
| Coke, % wt | 5.7 | 5.6 | 3.6 | 2.9 | 2.6 |
| Carbon on catalyst, % wt | 2.48 | 2.44 | 1.55 | 1.29 | 1.17 |

Referring to Table 15, in every instance the performance of Catalyst C was superior to that of either of Catalysts A or B.

Variations can, of course, be made without departing from the spirit and scope of the invention.

Having thus described the invention what is desired to be secured by Letters Patent and hereby claimed is:

1. A method of preparing a rare earth-impregnated composite catalytic composition comprising a matrix having a crystalline aluminosilicate zeolite dispersed therein, said crystalline aluminosilicate zeolite carrying rare-earth cations, said matrix comprising an inorganic oxide wherein at least 50 weight percent of said inorganic oxide is silica, alumina, or silica-alumina, said method comprising incorporating rare earth into said composite rare earth in an amount equivalent to about 1 to 6 percent by weight, expressed as $RE_2O_3$, said amount being over and above the rare earth level that would be present in said composite by virtue of rare earth ion exchange alone.

2. The method of claim 1 wherein said matrix additionally comprises a weighting agent selected from the group consisting of clay and alumina.

3. The method of claim 2 wherein said weighting agent is Kaolin clay.

4. The method of claim 1 wherein said incorporation is effected by impregnation of said composite with a rare earth-containing solution, removing excess solution, and drying.

5. The method of claim 1 wherein said incorporation is effected by impregnation of said matrix with rare earth, admixing the resulting rare earth-impregnated matrix with said particles of crystalline aluminosilicate, zeolite and drying.

6. The method of claim 1 wherein said incorporation is effected by treatment of said crystalline aluminosilicate zeolite with a rare earth-containing solution, admixing the resultant rare earth-impregnated crystalline aluminosilicate zeolite with said matrix, and drying.

7. The method of claim 6 wherein said admixing is carried out in the absence of any intermediate washing.

8. The method of claim 6 wherein any washing carried out prior to said admixing is effected under such conditions as to permit removal of only a portion of the excess of rare earth ions present so that sufficient excess rare earth ions remains that upon drying, the resultant composite contains impregnated rare earth in an amount, expressed as $RE_2O_3$, of at least about 1 percent by weight, said amount being over and above the rare earth level that would be present in said composite by virtue of ion exchange alone.

9. The method of claim 4 wherein said drying is carried out over a period of at least 5 minutes, the water content during said period being not less than 20 weight percent.

10. A composite catalyst comprising a matrix having a particulate crystalline aluminosilicate zeolite dispersed therein, said crystalline aluminosilicate zeolite carrying rare earth cations, said matrix comprising an inorganic oxide wherein at least 50 weight percent of said inorganic oxide is silica, alumina, or silica-alumina, said composite containing impregnated rare earth in an amount equivalent to about 1 to 6 percent by weight, expressed as $RE_2O_3$, said amount being over and above the rare earth level present in said composite by virtue of rare earth ion exchange alone.

11. The catalyst of claim 10 wherein said matrix additionally comprises a weighting agent selected from the group consisting of clay and alumina.

12. The catalyst of claim 11 wherein said weighting agent is Kaolin clay.

13. The catalyst of claim 10 wherein said inorganic oxide is silica, silica-alumina, silica-zirconia, or silica-zirconia-alumina, said inorganic oxide having a pore volume of at least about 0.4 cc per gram.

14. The catalyst of claim 11 wherein said weighting agent is clay, said weighting agent is from about 30 to 50 weight percent of said matrix and said inorganic oxide is correspondingly from about 70 to 50 weight percent of said matrix, and said crystalline aluminosilicate zeolite is present in said composite in an amount of from about 5 to 15 percent by weight.

15. A method of catalytically converting petroleum charge stocks comprising contacting a petroleum charge stream under catalytic conversion conditions with the catalyst of claim 10.

16. The method of claim 15 wherein the conversion process is catalytic cracking.

* * * * *

UNITED STATES PATENT AND TRADEMARK OFFICE
CERTIFICATE OF CORRECTION

PATENT NO. : 3,930,987
DATED : January 6, 1976
INVENTOR(S) : HARRY S. GRAND

It is certified that error appears in the above-identified patent and that said Letters Patent are hereby corrected as shown below:

Abstract, line 11, "impregnated" should be new sentence --Impregnated--.

Column 10, line 27, "contracting" should be --contacting--.

Column 35, line 39, "$Na_2=4\%$"). should read --$Na_2O=4.0\%$--).

Column 37, line 43, "slat" should be --salt--.

Signed and Sealed this

Sixteenth Day of November 1976

[SEAL]

Attest:

RUTH C. MASON
*Attesting Officer*

C. MARSHALL DANN
*Commissioner of Patents and Trademarks*